(12) United States Patent
Selepack et al.

(10) Patent No.: US 11,319,501 B2
(45) Date of Patent: May 3, 2022

(54) PRELUBRICATED STOCK SHEET AND METHOD AND SYSTEM FOR MAKING THE SAME

(71) Applicant: Golden Aluminum Company, Fort Lupton, CO (US)

(72) Inventors: Mark Selepack, Longmont, CO (US); Chris Michael Moellers, Firestone, CO (US)

(73) Assignee: Golden Aluminum Company, Fort Lupton, CO (US)

( * ) Notice: Subject to any disclaimer, the term of this patent is extended or adjusted under 35 U.S.C. 154(b) by 359 days.

(21) Appl. No.: 16/274,894

(22) Filed: Feb. 13, 2019

(65) Prior Publication Data
US 2019/0177634 A1 Jun. 13, 2019

Related U.S. Application Data

(62) Division of application No. 15/250,591, filed on Aug. 29, 2016, now Pat. No. 10,793,799.
(Continued)

(51) Int. Cl.
*B05C 1/10* (2006.01)
*C10M 101/02* (2006.01)
(Continued)

(52) U.S. Cl.
CPC ......... *C10M 101/02* (2013.01); *B05C 1/0826* (2013.01); *B05C 1/10* (2013.01);
(Continued)

(58) Field of Classification Search
None
See application file for complete search history.

(56) References Cited

U.S. PATENT DOCUMENTS

| 4,258,649 A * | 3/1981 | Dunn, Jr. ............. B05D 3/0473 118/326 |
| 5,401,575 A | 3/1995 | Anglin et al. |

(Continued)

FOREIGN PATENT DOCUMENTS

WO  WO 1996/015857  5/1996

OTHER PUBLICATIONS

International Search Report and Written Opinion for International Patent Application No. PCT/US16/49298, dated Feb. 1, 2017, 10 pages.
(Continued)

*Primary Examiner* — Charles Capozzi
(74) *Attorney, Agent, or Firm* — Sheridan Ross P.C.

(57) ABSTRACT

A pre-lubricated stock sheet and a method and system for making the same are described. The pre-lubricated stock is generally in a coil wound form. The stock sheet can have opposing first and second sheet surfaces joined together by opposing side edges and opposing ends. Typically, the first and second sheet surfaces are substantially smooth and planar, wherein the sheet has 3 mg/foot$^2$/side to about 200 mg/foot$^2$/side of a solid lubricant having a melting temperature from about 80 to 212 degrees Fahrenheit. Moreover, the opposing side edges usually are substantially free of the solid lubricant. In some configurations, the stock sheet is an aluminum stock sheet, more particularly an aluminum can stock sheet. Furthermore, the lubricant can be in some configurations a food grade lubricant, that is qualifies a low volatile organic compound under one or more of municipal, state and federal governing authorities.

19 Claims, 22 Drawing Sheets

Related U.S. Application Data

(60) Provisional application No. 62/219,485, filed on Sep. 16, 2015, provisional application No. 62/214,540, filed on Sep. 4, 2015, provisional application No. 62/213,376, filed on Sep. 2, 2015, provisional application No. 62/211,180, filed on Aug. 28, 2015.

(51) Int. Cl.
| | |
|---|---|
| *C10M 105/04* | (2006.01) |
| *C10M 105/36* | (2006.01) |
| *C10M 105/70* | (2006.01) |
| *C10M 105/72* | (2006.01) |
| *C10M 107/10* | (2006.01) |
| *B32B 15/04* | (2006.01) |
| *B32B 15/085* | (2006.01) |
| *B05C 1/08* | (2006.01) |
| *C10N 30/00* | (2006.01) |
| *C10N 40/24* | (2006.01) |
| *C10N 50/08* | (2006.01) |

(52) U.S. Cl.
CPC ............ *B32B 15/04* (2013.01); *B32B 15/085* (2013.01); *C10M 105/04* (2013.01); *C10M 105/36* (2013.01); *C10M 105/70* (2013.01); *C10M 105/72* (2013.01); *C10M 107/10* (2013.01); *C10M 2203/0206* (2013.01); *C10M 2203/1006* (2013.01); *C10M 2203/1065* (2013.01); *C10M 2205/0285* (2013.01); *C10M 2207/2825* (2013.01); *C10M 2215/2203* (2013.01); *C10M 2215/2245* (2013.01); *C10M 2219/0406* (2013.01); *C10N 2030/62* (2020.05); *C10N 2040/24* (2013.01); *C10N 2050/08* (2013.01)

(56) References Cited

U.S. PATENT DOCUMENTS

| | | | |
|---|---|---|---|
| 5,849,086 A * | 12/1998 | Boelkins | B05C 1/0813 |
| | | | 118/683 |
| 5,849,098 A | 12/1998 | Volkmann | |
| 5,882,469 A * | 3/1999 | Detterman | B42C 11/045 |
| | | | 156/359 |
| 5,891,509 A * | 4/1999 | Kawana | B05D 3/0263 |
| | | | 427/10 |
| 7,329,622 B1 * | 2/2008 | Ulli | B05C 1/003 |
| | | | 427/208 |
| 2002/0073920 A1 * | 6/2002 | Obermark | B05C 1/0813 |
| | | | 118/244 |
| 2003/0044544 A1 * | 3/2003 | Tracy | B05C 1/0813 |
| | | | 427/156 |
| 2004/0018947 A1 | 1/2004 | Anglin et al. | |
| 2008/0023485 A1 * | 1/2008 | Raines | B05C 5/0216 |
| | | | 222/1 |
| 2009/0258804 A1 | 10/2009 | Januszkiewicz et al. | |
| 2013/0171920 A1 * | 7/2013 | Bhattacharya | B05B 12/08 |
| | | | 454/52 |
| 2015/0053330 A1 * | 2/2015 | Fischer | B32B 37/0076 |
| | | | 156/176 |
| 2017/0056952 A1 | 3/2017 | Selepack | |

OTHER PUBLICATIONS

International Preliminary Report on Patentability for International Patent Application No. PCT/US16/49298, dated Mar. 15, 2018, 7 pages.
Official Action for U.S. Appl. No. 15/250,591, dated Jan. 30, 2019, 6 pages. Restriction Requirement.
Official Action for U.S. Appl. No. 15/250,591, dated Apr. 17, 2019, 8 pages.
Official Action for U.S. Appl. No. 15/250,591, dated Oct. 28, 2019, 10 pages.

* cited by examiner

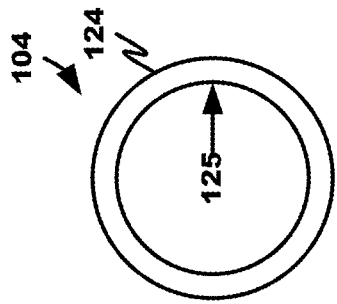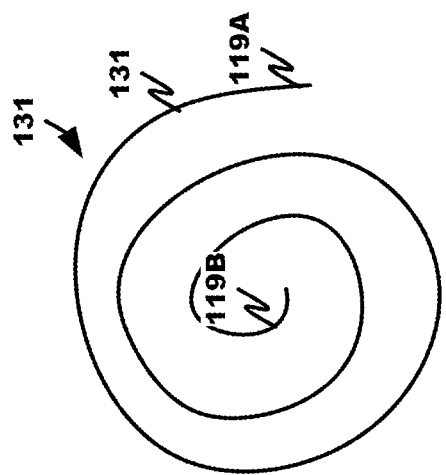

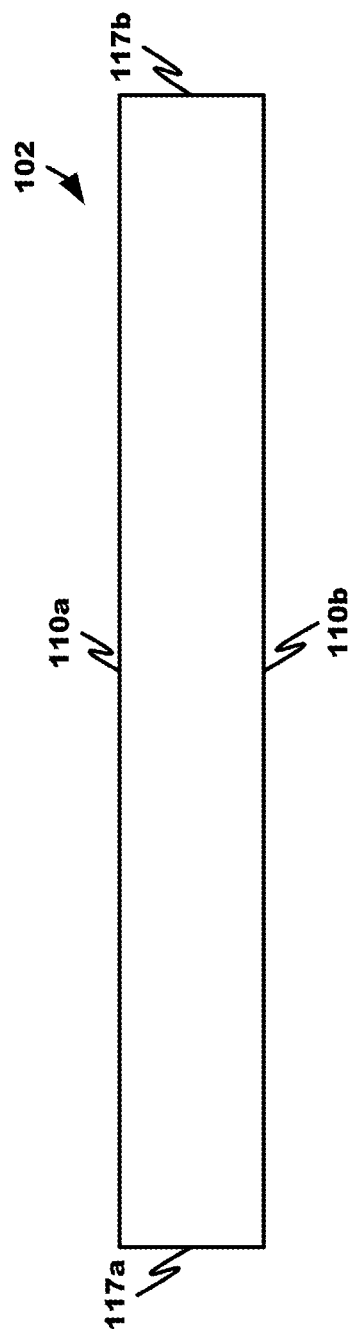
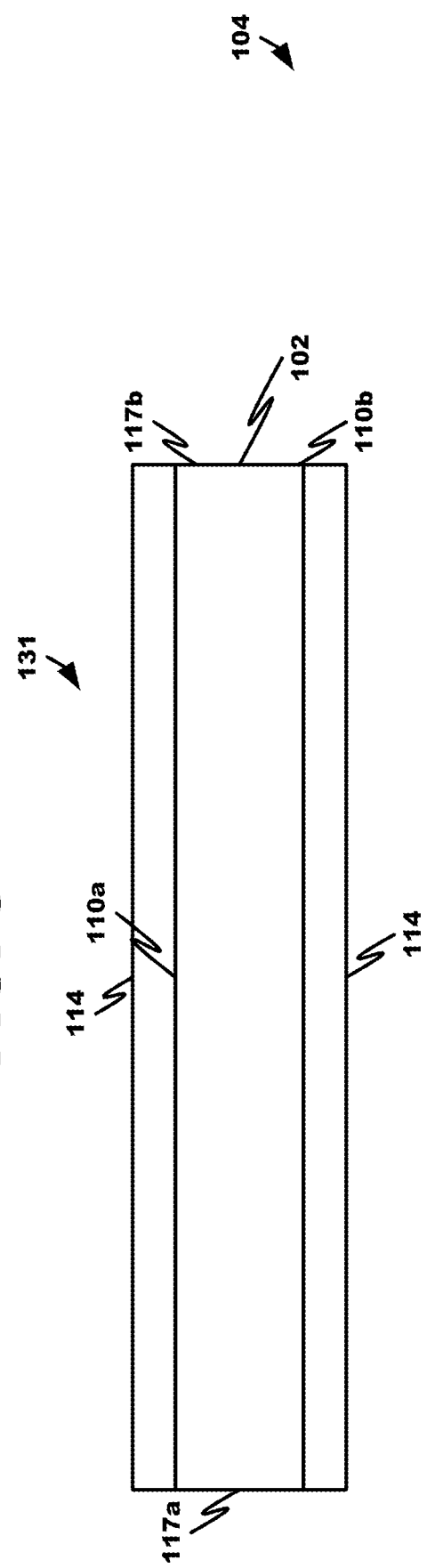
FIG. 6
FIG. 7

PRELUBRICATED STOCK SHEET AND METHOD AND SYSTEM FOR MAKING THE SAME

CROSS REFERENCE TO RELATED APPLICATION

The present application is a divisional application of U.S. patent application Ser. No. 15/250,591, filed Aug. 29, 2016, which issued as U.S. Pat. No. 10,793,799 on Oct. 6, 2020, and which claims the benefits of U.S. Provisional Application Ser. Nos. 62/211,180, filed Aug. 28, 2015, 62/213,376, filed Sep. 2, 2015, 62/214,540, filed Sep. 4, 2015, and 62/219,485, filed Sep. 16, 2015, each entitled "Method and System for Applying Lube to Aluminum Sheet", each of which is incorporated herein by this reference in their entirety.

BACKGROUND

A stamping press is a machine tool used to shape or cut a sheet into desired objects by deforming it with a die. A press typically has a bolster plate, die, and a ram. The bolster plate (or bed) is a large block of metal upon which the bottom portion of the die is clamped. The bolster plate is stationary. Stamping presses can be subdivided into mechanically driven presses and hydraulically driven presses. Typically, presses are electronically linked (with a programmable logic controller) to an automatic feeder which feeds metal raw material through the die. The raw material is fed into the automatic feeder after it has been unrolled from a coil and put through a straightener.

To avoid damage to the sheet and die when subjected to the substantial pressures encountered in the stamping press, it is common for the stamping press operator to apply a lubricant material to the sheet before stamping. The lubricant has been applied by many techniques, including a sprayer or roll coater. These techniques apply the lubricant in a layer of non-uniform thickness, which can cause problems during stamping.

SUMMARY

The various aspects, embodiments, and configurations of the present disclosure address these and other needs. The disclosure is directed to a method and system for applying lubricant to a stock sheet to form a lubricated stock sheet before the further processing of the stock sheet, such as by stamping. In some embodiments, the lubricant is applied to the stock sheet by the stock sheet manufacturer before shipment to a stamping press facility.

According to the disclosure, a solid lubricant is melted and applied as a liquid to the stock sheet in a desired consistency and thickness. The lubricant, which has a melting point above room (ambient) temperature, solidifies at ambient temperature before coiling and shipment of the stock sheet to the stamper and/or former, such as a container or automotive manufacturer.

The stock sheet can be any metal comprising a metal or a mixture of metals. Examples include steel sheet, aluminum sheet, copper sheet, and the like. The metal sheet can be used not only in the fabrication of containers but also in the fabrication of automotive parts and innumerable other applications.

The stock sheet can be a nonmetal material, such as plastic or glass sheet.

The stock sheet can be steel, stainless steel, copper, tin, nickel, gold, platinum, rhodium, aluminum, an organic polymeric material, a metal, an alloyed metal, or a combination thereof. The stock sheet can be selected from the group consisting essentially of steel, stainless steel, copper, tin, nickel, gold, platinum, rhodium, aluminum, an organic polymeric material, a metal, an alloyed metal, or a combination thereof.

The stock sheet may or may not be coil wound. In some embodiments, the coil wound sheet can be an automotive sheet stock. Generally, the automotive sheet stock is one of 3000 series, 5000 series, 6000 series, 7000 series or other aluminum or steel alloy. In some embodiments, the coil wound sheet can be tab stock for a container.

The lubricant is normally a solid at ambient temperature. The solid lubricant can have a melting temperature from about 80 to 212 degrees Fahrenheit, more commonly, more commonly from about 100 to 200 degrees Fahrenheit, and even more commonly from about 140 to 195 degrees Fahrenheit. In some embodiments, the solid lubricant can be a food grade lubricant. The solid lubricant can commonly be one or more of a NSF, Kosher or Halal approved food grade lubricant. Generally, the solid lubricant can be one of dioctyl sulfosuccinate, 1-butyl-3-methylimidazolium bis(trifluoromethylsulfonyl) imide, dioctyl sebacate, bis(2-ethylhexyl) sebacate, sebacic acid di(2-ethylhexyl) ester, hydrotreated heavy naphthenic petroleum distillates, alkenes having a carbon chain length greater than ten, and poly-α-olefin, petrolatum, and mixtures thereof. Typically, the solid lubricate is a FDA approved lubricant per 21 CFR 178.3910 Paragraph (b). In some embodiments, the solid lubricant can qualify as a low volatile organic compound under one or more of municipal, state and federal governing authorities.

The lubricant can be applied precisely to selected areas of the sheet. For example, the opposing side edges of the sheet can be substantially free of the solid lubricant while the upper and lower surfaces of each of the first (upper) and second (lower) sheet surfaces contain a substantially continuous and uniform lubricant layer.

In some applications, the first (upper) and second (lower) surfaces, respectively, can have first and second sheet surface areas. More typically, from about 99 to 100% of the first and second sheet surface areas are in contact with the solid lubricant.

Each of the first and second sheet surfaces can commonly have from about 3 mg/foot$^2$/side to about 200 mg/foot$^2$/side of the lubricant, more commonly about 5 mg/foot$^2$/side to about 110 mg/foot$^2$/side of the lubricant or even more commonly about 60 mg/foot$^2$/side to about 90 mg/foot$^2$/side of the lubricant. In some embodiments, each of the upper and lower surfaces of the sheet can generally have about 150±10 mg/foot$^2$ of lubricant, more generally about 100±10 mg/foot$^2$ of lubricant, even more generally about 80±10 mg/foot$^2$ of lubricant, and even more generally about 90±10 mg/foot$^2$ of lubricant.

The lubricant is applied by a device having one or more pairs of applicators, with the applicators in each of the one or more pairs of applicators applying lubricant to one of the opposing first and second stock sheet surfaces. Each applicator can include: a porous applicator element commonly having first and second porous element surfaces; a perforated applicator element generally having first and second perforated element surfaces, with the first perforated element surface typically being in contact with the second porous element surface; and a liquid-dispensing element, with the liquid-dispensing element generally dispensing a liquid lubricant. The dispensed liquid lubricant can contact the second perforated element surface. The device can also have a pressure-adjusting element, one or more heating elements, and an enclosure. The applicators and heating elements can be contained with the enclosure. The device can also include a lubricant-containing vessel in fluid communication with each of the liquid-dispensing elements of the applicators.

Each applicator can have an applicator axis. The liquid-dispensing element can be positioned along the applicator axis. The first porous element surface can be the outer surface of each applicator of the one or more applicators. The second perforated element surface can be the inner surface of each of applicator.

The enclosure can further include a sheet inlet and a sheet outlet configured for the stock sheet to traverse the enclosure. The sheet can traverse midway between each pair of the applicators. The enclosure can be insulated, non-insulated, or a combination thereof.

The pairs of applicators can be arranged in series (with respect to a selected portion of the stock sheet surface) or parallel (with respect to a width of the stock sheet surface). The pairs of applicators can include from about two to about three pairs of applicators. About two to about six pairs of applicators can be arranged in series.

The one or more heating elements can be positioned between the enclosure and pairs of applicators. The one or more heating elements can be positioned symmetrically about the pairs of applicators and provide sufficient thermal energy to the applicators to maintain a temperature within the enclosure of from about 80 to 212 degrees Fahrenheit, more commonly from about 100 to 200 degrees Fahrenheit, and even more commonly from about 140 to 195 degrees Fahrenheit. The one or more heating elements can be one of an electrical resistance heating element, a hot water radiant heating element, a stream radiant heating element, a high-pressure steam radiant heating element, a super-critical steam radiant heating element, an infrared heating element, or a hot oil radiant heating element.

The perforated applicator element can be a metallic material, a polymeric material, or a combination thereof. When a metallic material is used, the perforated applicator element can be steel, stainless steel, aluminum, stainless steel, or brass. The perforated applicator element can have a plurality of apertures, a plurality of channels, or a combination thereof substantially uniformly distributed over the perforated applicator element surface area. Furthermore, the plurality of apertures, the plurality of channels, or the combination thereof are sufficiently sized such that lubricant is uniformly distributed to the porous applicator element and is not retrained by perforated applicator element.

The porous applicator element can comprise one of a textile material, an organic polymeric material, an inorganic polymeric material, or a combination thereof. Furthermore, the porous applicator element can comprise one of a felt, a non-woven material, a solid foam material, a sponge material, or a fabric. Moreover, the porous applicator element can be permeable, porous, or both porous and permeable. Usually, the porous applicator element can have a wall thickness from about $1/16$ to about $1/2$ and more commonly from about $1/8$ to about $1/4$ of an inch.

Each adjacent pair of applicators can have first and second applicator axes aligned in parallel, with a distance between them. First and second outer surfaces of the applicators forming each pair of applicators are generally separated by a distance sufficient to accept the stock sheet. Typically, a pressure-adjusting element can increase and/or decrease the pressure of the first second outer surfaces of the applicators on the stock sheet positioned between them.

The pressure-adjusting element can increase and/or decrease the pressure of the first and second outer surfaces of applicators on the stock sheet positioned between them. It can be appreciated that the pressure-adjusting element can include one of an electromechanical device, a solenoid, a pneumatic device, or a combination thereof. The pressure-adjusting element can be contained within the enclosure, external to the enclosure, or partially contained within the enclosure and partially contained external to the enclosure.

The device can include one or more temperature sensing elements. The enclosure can have a void volume having a void volume temperature, where the temperature sensing elements can determine the void volume temperature. The temperature sensing elements can be contained within or located outside of the enclosure. Some of the temperature sensing elements can be configured external to the enclosure while others are contained within the enclosure.

The lubricant-containing vessel can be a heated vessel containing a liquefied lubricant. Generally, the lubricant-containing vessel is heated to a temperature greater than the ambient temperature to liquefy the solid lubricant.

The device can include a pressurizing element. Generally, the pressurizing element conveys the liquefied lubricant from the lubricant-containing vessel to the liquid-dispensing elements of each of the applicators. The pressurizing element can pressurize the headspace of the lubricant-containing vessel. The pressure of the pressurized headspace can be sufficient to force the liquefied lubricant from lubricant-containing vessel to the liquid dispensing elements. Generally, the liquefied lubricant is convey to the liquid dispensing element without the need to pump the liquefied lubricant from the lubricant-containing vessel. This can be, for example, a pressurized head space in a container in the absence of a pump to avoid lubricant solidification and pump malfunction.

In operation, a stock sheet is input into the device and contacted with one or more pairs of applicators to form opposing lubricated layers on the first and second stock sheet surfaces. The lubricated stock sheet can be wound coil into a roll of the lubricated stock sheet. The liquefied lubricant is generally applied at a temperature greater than the ambient temperature. Typically, the contacting step occurs at a temperature from about 80 to 212 degrees Fahrenheit, more commonly, more commonly from about 100 to 200 degrees Fahrenheit, and even more commonly from about 140 to 195 degrees Fahrenheit. While the lubricant is typically a solid lubricant at ambient temperature, it is commonly deposited (on the interior areas of the stock sheet) in a liquefied state but the opposing stock sheet edges are commonly substantially free of the liquefied lubricant.

The device can flow the liquefied lubricant from a lubricant-containing vessel to a liquid-dispensing element; dispense, from the liquid-dispending element, the liquefied lubricant to a perforated applicator element having first and second perforated element surfaces, and contact the first porous element surface with the stock sheet surface to deposit the liquefied lubricant on the stock sheet. The perforated applicator element can typically be in fluid communication with a porous applicator element having first and second porous element surfaces. The liquefied lubricant can flow from the first perforated element surface to the second porous element surface and from the second porous element surface to the first porous element surface.

In some embodiments, the stock sheet can commonly be contacted with each pair of the one or more pairs of applicators at a rate of about 50 to about 6,000 feet per minute, more commonly at a rate of about 100 to about 2,000 feet per minute, or even more commonly at a rate of about 400 to about 700 feet per minute.

The present disclosure can provide a number of advantages depending on the particular configuration. The method and system of this disclosure can provide a substantially, continuous, consistent and uniform lubricant layer thickness over the upper and lower surfaces of the stock sheet. The method and system can provide highly controlled lubricant application in amount and coverage. Sufficient lubricant can be applied by the stock sheet manufacturer to avoid the stamping press operator from needing to deposit the lubricant. The substantially continuous and consistent lubricant layer thickness over the area of the stock sheet can provide better results in stamping operations (such as tab formation) than other lubrication techniques and yield longer die life. The disclosed method also allows no lubricant to be used at the stamper press and to decrease the volatile organic compound levels at the conversion press to decreased and/or eliminated. The lubricant also protects the die and reduces and/or eliminates fines produced during the forming/stamping process. The reduction of fines decreases and/or eliminated sharp edge formation and wear on the die tool.

These and other advantages will be apparent from the disclosure of the aspects, embodiments, and configurations contained herein.

It can be appreciated that the perforated applicator element and the porous applicator element can have any shape. In some embodiments, the perforated applicator element and the porous applicator element can have a cylindrical shape. In some embodiments, the perforated applicator element and the porous applicator element can have elliptical shapes.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Unless otherwise noted, all component or composition levels are in reference to the active portion of that component or composition and are exclusive of impurities, for example, residual solvents or by-products, which may be present in commercially available sources of such components or compositions.

All percentages and ratios are calculated by total composition weight, unless indicated otherwise.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein. By way of example, the phrase from about 2 to about 4 includes the whole number and/or integer ranges from about 2 to about 3, from about 3 to about 4 and each possible range based on real (e.g., irrational and/or rational) numbers, such as from about 2.1 to about 4.9, from about 2.1 to about 3.4, and so on.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 3 depicts a cross-sectional view of the component having reference number 108 in FIG. 1:

FIG. 4 depicts a cross-sectional view of the component having reference number 104 in FIG. 1;

FIG. 5 depicts a cross-sectional view of the component having reference number 106 in FIG. 1;

FIG. 6 depicts a cross-sectional view of the component having reference number 102 in FIG. 1;

FIG. 7 depicts a cross-sectional view of the component having reference number 131 in FIG. 1;

DETAILED DESCRIPTION

The method discussed herein can apply to stock sheet, with aluminum alloy sheet being illustrative.

Figure 1:
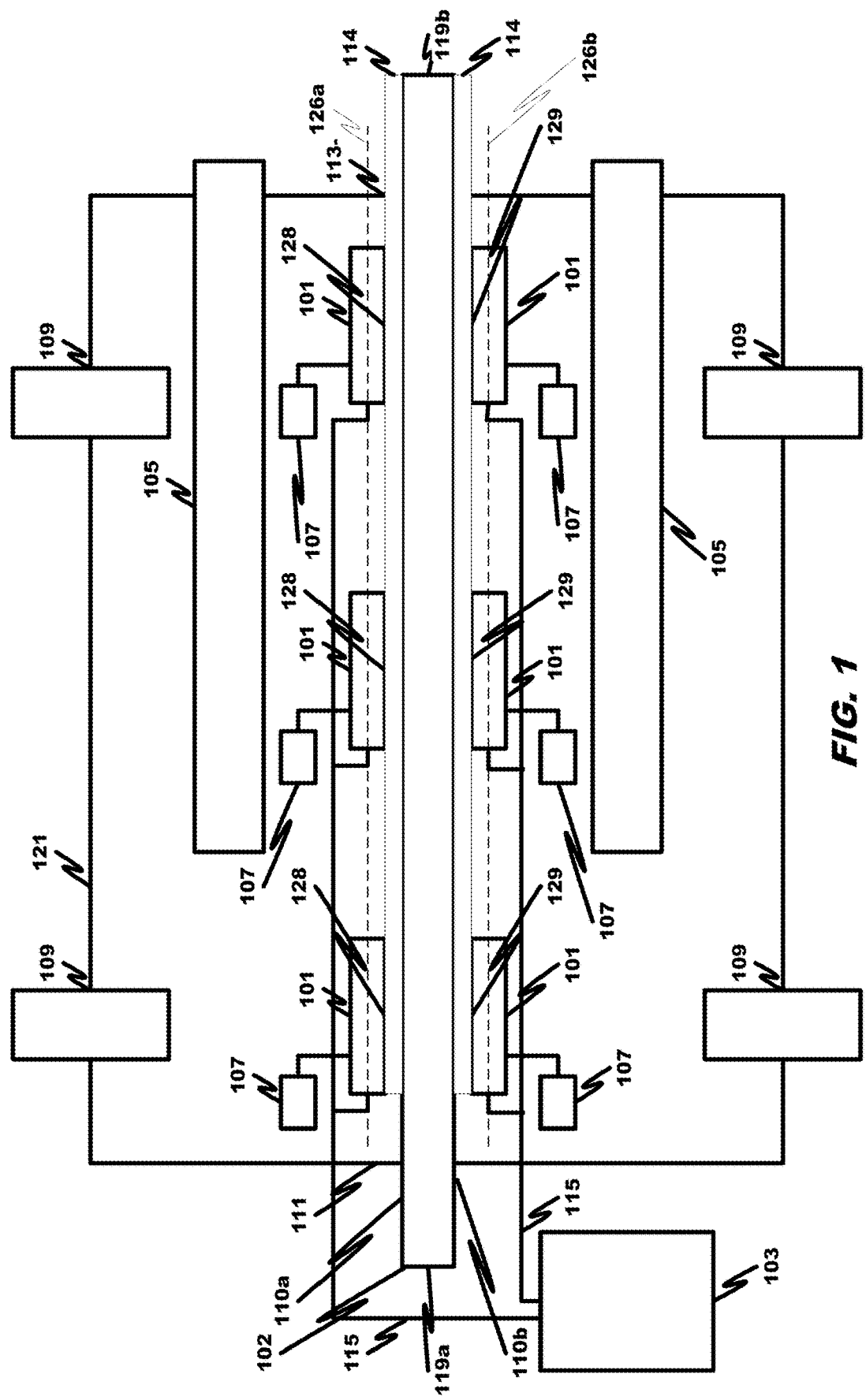
FIG. 1 depicts a device according to some embodiments of the present disclosure.
Figure 2:
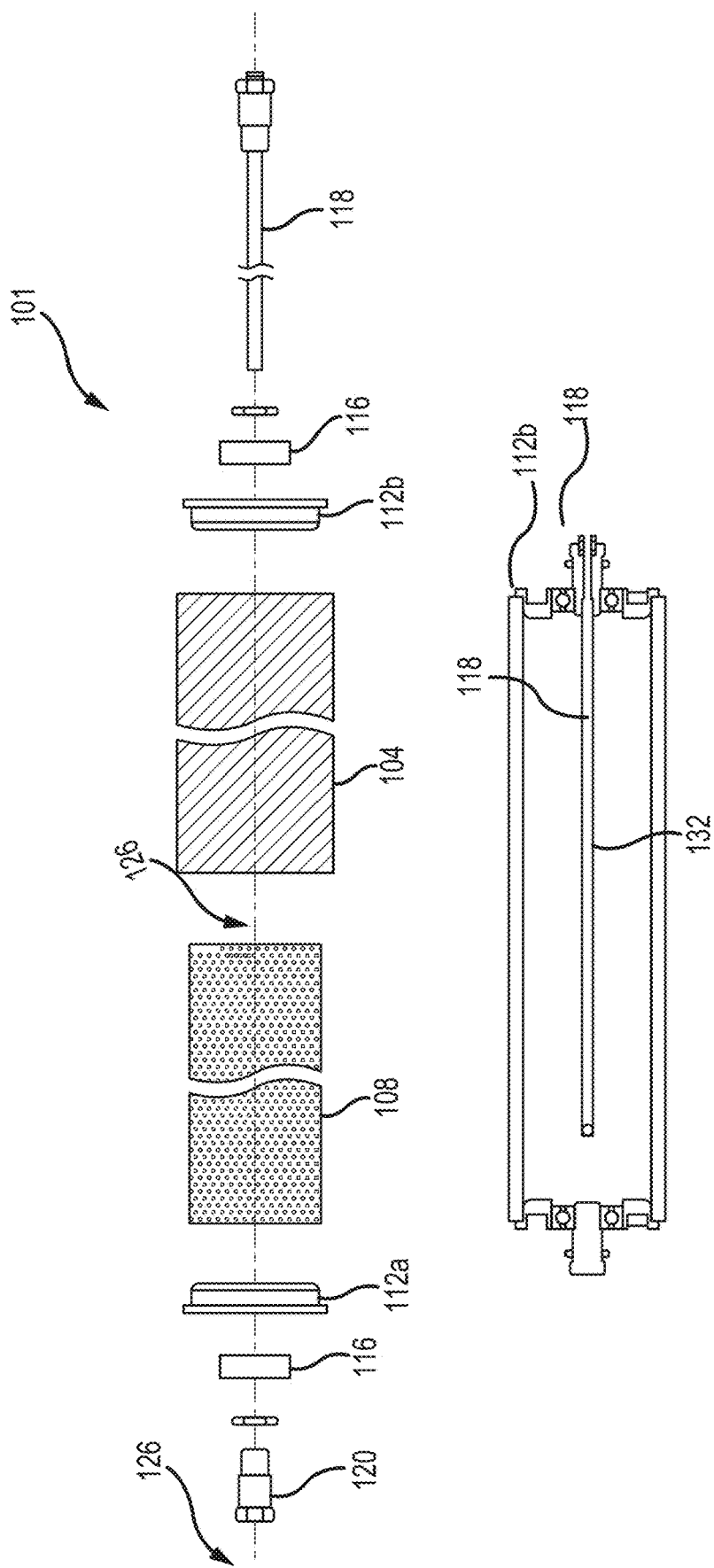
FIG. 2 depicts an exploded view of the component having reference number 101 in FIG. 1.

FIG. 1 depicts a device 100 according to some embodiments. The device 100 can have one or more pairs of applicators 101a and 101b, 101r and 101s, and so forth to 101y and 101z with each applicator 101 of the more of more pairs of applicators 101a and 101b, 101r and 101s, and 101y and 101z. Each applicator 101 can include a porous applicator element 104, a perforated applicator element 108, and a liquid-dispensing element 118 (FIG. 2).

Each applicator 101 of the one or more pair of applicators 101a and 101b, 101r and 101s, and so forth to 101y and 101z can have an applicator axis 126. The liquid-dispensing element 118 is generally positioned along the applicator axis 126.

The perforated applicator element 108 can have first 122 and second 123 perforated element surfaces (FIG. 3). The porous applicator element 104 can have first 124 and second 125 porous element surfaces (FIG. 4). The first porous element surface 124 is generally the outer surface of each applicator 101 of the one or more applicators 101a and 101b, 101r and 101s, and 101y and 101z. Moreover, the second perforated element surface 123 is typically the inner surface of each of applicator 101 of the one the one or more pair applicators 101a and 101b, 101r and 101s, and 101y and 101z. The first perforated element surface 122 is usually in contact with the second porous element surface 125.

The one or more pairs of applicators 101a and 101b, 101r and 101s, and 101y and 101z can be configured consecutively. In some embodiments, the one or more pairs of applicators 101a and 101b, 101r and 101s, and 101y and 101z can include from about two to about three pairs of applicators 101. Moreover, the about two to about six pairs of applicators 101 can be configured consecutively. In some embodiments, the one or more pairs of applicators 101a and 101b, 101r and 101s, and 101y and 101z can include three pairs of applicators 101. Furthermore, the three pairs of applicators 101 can be configured consecutively.

The perforated applicator element 108 can be one of a metallic material, a polymeric material, or a combination thereof. Generally, the perforated applicator element 108 can be one of steel, stainless steel, aluminum, stainless steel, or brass. More generally, the perforated applicator element 108 can be a metallic material. Furthermore, the perforated applicator element 108 can have a plurality of apertures, channels, or a combination thereof substantially uniformly distributed about most, if not all, of the perforated applicator element 108. Moreover, the perforated applicator element 108 can have a plurality of apertures, a plurality of channels, or a combination thereof substantially uniformly distributed over the perforated applicator element surface area. Furthermore, the plurality of apertures, the plurality of channels, or the combination thereof are sufficiently sized such that lubricant is uniformly distributed to the porous applicator element 104 and is not retrained by perforated applicator element 108.

The porous applicator element 104 can comprise one of a textile material, an organic polymeric material, an inorganic polymeric material, or a combination thereof. Furthermore, the porous applicator element 104 can comprise one of a felt, a non-woven material, a solid foam material, a sponge material, or a fabric. Moreover, the porous applicator element 104 can be permeable, porous, or both porous and permeable. Usually, the porous applicator element 104 can have a wall thickness from about ⅛ to about ¼ of an inch.

Each pair of applicators 101 can have first 126a and second 126b applicator axes aligned in parallel. First 128 and second outer 129 surfaces of the applicators forming each pair of applicators (such as 101a and 101b, 101r and 101s, and 101y and 101z) are generally separated by a distance sufficient for accepting the stock sheet. The pressure-adjusting element 107 increases and/or decreases the distance such that the first 128 and second 129 outer surfaces of applicators 101 can apply a pressure on the stock sheet 102 positioned between the first and second applicators. It can be appreciated that in some embodiments, the pressure-adjusting element comprises one of an electromechanical device, a solenoid, a pneumatic device, or a combination thereof. Furthermore, the pressure-adjusting element 107 can be one of contained within the enclosure 121, external to the enclosure, or partially contained within the enclosure 121 and partially contained external to the enclosure 121.

The liquid-dispensing element 118 generally dispenses a liquid lubricant. The dispensed liquid lubricant generally contacts the second perforated element surface 123.

The device 100 can also have one or more pressure-adjusting elements 107. Typically, each of the applicators 101 has at least one pressure-adjusting element 107.

The device 100 can also have one or more heating elements 105. The one or more heating elements 105 can be positioned between the enclosure 121 and the one or more pairs of applicators 101a and 101b, 101r and 101s, and 101y and 101z. The device 100 can include the one or more heating elements 105 being positioned symmetrically about the one or more pairs of applicators 101a and 101b, 101r and 101s, and 101y and 101z. Moreover, the one or more heating elements 105 can provide sufficient thermal energy to the one or more pairs of applicators 101a and 101b, 101r and 101s, and 101y and 101z to maintain a temperature within the enclosure 121 of from about 80 to 212 degrees Fahrenheit, more commonly, more commonly from about 100 to 200 degrees Fahrenheit, and even more commonly from about 140 to 195 degrees Fahrenheit. Generally, the one or more heating elements 105 can be one of an electrical resistance heating element, a hot water radiant heating element, a stream radiant heating element, a high-pressure steam radiant heating element, a super-critical steam radiant heating element, an infrared heating element, or a hot oil radiant heating element.

The device 100 can also have an enclosure 121. The enclosure 121 can have a sheet stock inlet 111 and a sheet stock outlet 113. Moreover, the sheet stock inlet 111 and outlet 113 can be configured for a stock sheet 102 to traverse the enclosure 121. The stock sheet 102 can traverse midway between each pair of the one or more pairs of applicators 101a and 101b, 101r and 101s, and 101y and 101z. Typically, the enclosure 121 can be one of an insulated enclosure, a non-insulated enclosure, or a combination of insulated and non-insulated portions. The one or more pairs of applicators 101a and 101b, 101r and 101s, and so forth to 101y and 101z and the one or more heating elements 105 can be contained with the enclosure 121.

The device 100 can also have a lubricant-containing vessel 103. The lubricant-containing vessel 103 is generally in fluid communication with each of the liquid-dispensing elements 118 of the applicators 101. The lubricant-containing vessel 103 is typically in fluid communication with each of the liquid-dispensing elements 118 through conduit 115.

The device 100 can further include one or more temperature sensing elements 109. The enclosure 109 can have a void volume 130 having a void volume temperature. The one or more temperature sensing elements 109 can determine the void volume temperature. In some embodiments, the one or more temperature sensing elements 109 can be contained within the enclosure 121. In some embodiments, the one or more temperature sensing elements 109 can be configured external to the enclosure 121. In some embodiments, some of the one or more temperature sensing elements 109 can be configured external to the enclosure 121 and the others of the one or more temperature sensing elements 109 can be contained within the enclosure 121.

The lubricant is typically a solid at ambient temperature. Generally, the lubricant-containing vessel 103 can be a heated to maintain the lubricant within the lubricant-containing vessel at a temperature greater than the ambient temperature. Commonly, the lubricant-containing vessel 103 contains lubricant in a liquefied form. The lubricant-containing vessel 103 is generally heated to a temperature greater than the ambient temperature to liquefy the lubricant.

The device 100 can further have a pressurizing element (not depicted). The pressurizing element can convey the liquefied lubricant from the lubricant-containing vessel 103 to the liquid-dispensing elements 118 of each of the applicators 101.

The device 100 can produce a coil wound sheet 106 (FIG. 5) having opposing first 110a and second 110b sheet surfaces joined together by opposing side edges 117a and 117b and opposing ends 119a and 119b (FIGS. 6 and 7). The first 110a and second 110b sheet surfaces are typically substantially smooth and planar. The lubricant 114 on the coil wound sheet 106 is generally in the solid form at ambient temperature. That is, the lubricant 114 on the coil wound sheet 106 is typically a solid lubricant. The solid lubricant is generally deposited on the first 110a and second 110b sheet surfaces. The opposing sheet side edges 117a and 117b are commonly substantially free of the solid lubricant 114. The lubricated stock sheet 131 generally has from about 3.7 to about 13.9 mg per square meter of a lubricant 114 deposited on the sheet 120.

The first 110a and second 110b sheet surfaces, respectively, can have first and second sheet surface areas. Typically, more than about 95% of the first and second sheet surface areas are in contact with the solid lubricant 114. More typically, more than about 98% of the first and second sheet surface areas are in contact with the solid lubricant 114. Even more typically, more than about 99% of the first and second sheet surface areas are in contact with the solid lubricant 114. Yet even more typically, more than about 99.8% of the first and second sheet surface areas are in contact with the solid lubricant 114.

The solid lubricant 114 is generally deposited on the first 110a and second 110b sheet surfaces of the coil wound sheet 106. The lubricated stock sheet 131 commonly has a sum total of solid lubricant 114 deposited on first 110a and second 110b surfaces of the coil wound sheet 106 is from about 3.7 to about 13.9 mg per square meter, more commonly from about 5.6 to about 11.6 mg per square meter, and even more commonly from 4.6 to about 9.3 mg per square meter.

The lubricant 114 can have a melting temperature from about 80 to 212 degrees Fahrenheit, more commonly, more commonly from about 100 to 200 degrees Fahrenheit, and even more commonly from about 140 to 195 degrees Fahrenheit.

The lubricant 114 can be a food grade lubricant. The lubricant 114 can commonly be one or more of a NSF, Kosher or Halal approved food grade lubricant. Generally, the lubricant can be one of dioctyl sulfosuccinate, 1-butyl-3-methylimidazolium bis(trifluoromethylsulfonyl)imide, dioctyl sebacate, bis(2-ethylhexyl) sebacate, sebacic acid di(2-ethylhexyl) ester, hydrotreated heavy naphthenic petroleum distillates, alkenes having a carbon chain length greater than ten, and poly-α-olefin, petrolatum, and mixtures thereof. The lubricate 114 is usually a FDA approved lubricant per 21 CFR 178.3910 Paragraph (b). Moreover, the lubricant 114 can qualify as a low volatile organic compound under one or more of municipal, state and federal governing authorities.

The first 110a and second 110b sheet surfaces can have can commonly have from about 3 mg/foot$^2$/side to about 200 mg/foot$^2$/side of the lubricant, more commonly about 5 mg/foot$^2$/side to about 110 mg/foot$^2$/side of the lubricant or even more commonly about 60 mg/foot$^2$/side to about 90 mg/foot$^2$/side of the lubricant. In some embodiments, each of the upper and lower surfaces of the sheet can generally have about 150±10 mg/foot$^2$ of lubricant, more generally about 100±10 mg/foot$^2$ of lubricant, even more generally about 80±10 mg/foot$^2$ of lubricant, and even more generally about 90±10 mg/foot$^2$ of lubricant.

The lubricated stock sheet 131 and/or coil wound sheet 106 can be one of steel, stainless steel, copper, tin, nickel, gold, platinum, rhodium, aluminum, an organic polymeric material, a metal, an alloyed metal, or a combination thereof. In some embodiments, the lubricated stock sheet 131 and/or coil wound sheet 106 can be selected from the group consisting essentially of steel, stainless steel, copper, tin, nickel, gold, platinum, rhodium, aluminum, an organic polymeric material, a metal, an alloyed metal, or a combination thereof.

The lubricated stock sheet 131 and/or coil wound sheet 106 can be an automotive sheet stock.

The lubricated stock sheet 131 and/or coil wound sheet 106 can be a can sheet body, tab or end stock. The can sheet stock can be one an AA 5182 series-based alloy, an AA5182ES, AA5182SP, AA5182FE, AA5182M8, an AA 3004 series-based alloy, AA3004, AA8011, AA3104, AA35182, AA3104, AA5052, and AA5006. In some embodiments, the can sheet stock can be one of steel and stainless steel.

Figure 8:
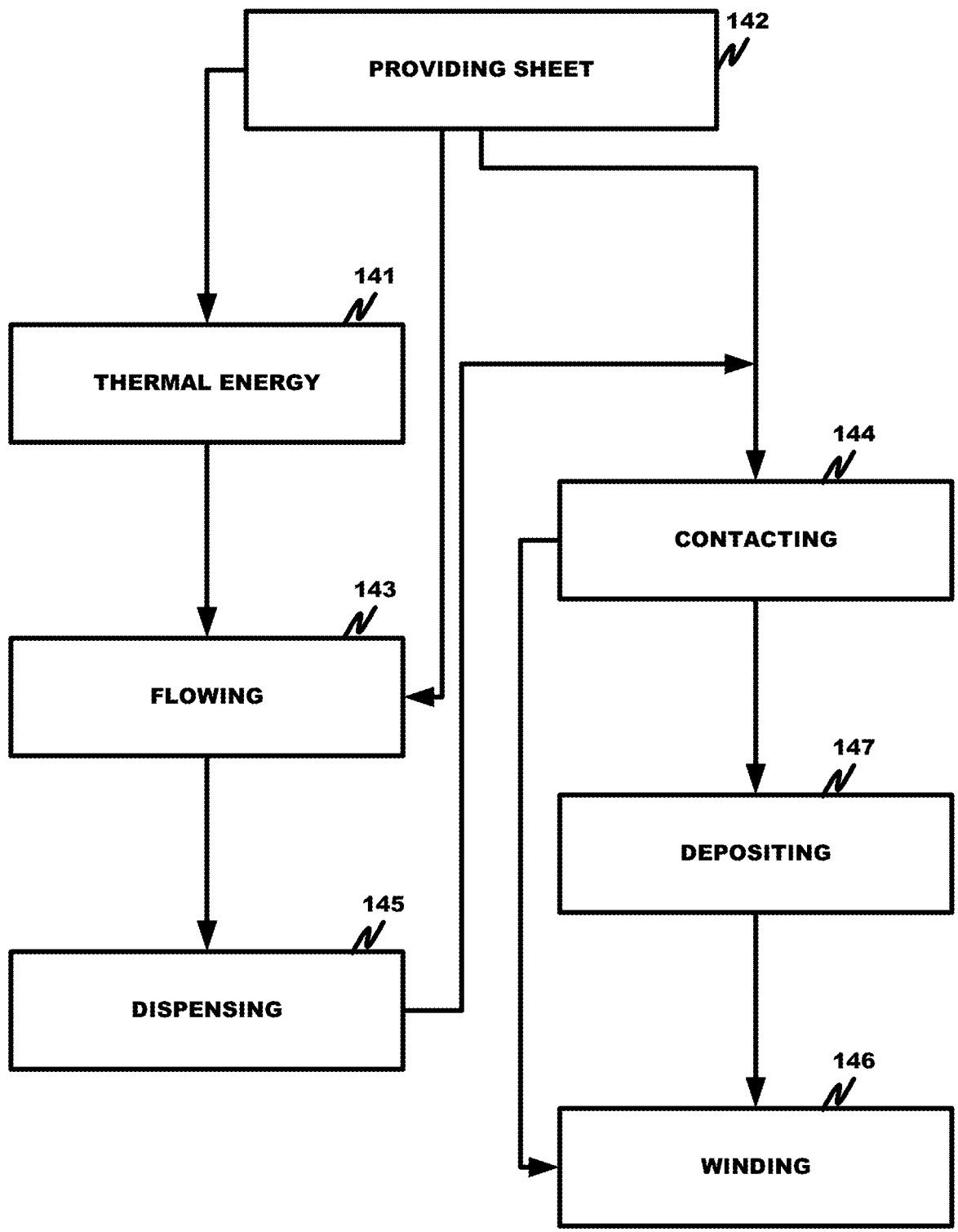
FIG. 8 depicts a process according to some embodiments of the present disclosure.

In accordance with some embodiments is a process 140 (FIG. 8).

In step 142, a stock sheet 102 is provided. The stock sheet can have opposing first 110a and second 110b stock sheet surfaces joined together by opposing stock sheet side edges 117a and 117b and opposing stock sheet ends 119a and 119b.

In step 144, the first 110a and second 110b stock sheet 102 surfaces are contacted with with one or more pairs of applicators 101a and 101b, 101r and 101s, and so forth to 101y and 101z to form a lubricated stock sheet 131. Contacting step 144 can include a step of depositing, step 147, with each pair of applicators 110 depositing a liquefied lubricant 114 on the first 110a and second 110b stock sheet surfaces to form the lubricated stock sheet 131.

The first 110a and second 110b sheet surfaces are typically substantially smooth and planar. The lubricant 114 on the coil wound sheet 106 is generally in the solid form at ambient temperature. That is, the lubricant 114 on the coil wound sheet 106 is typically a solid lubricant. The solid lubricant is generally deposited on the first 110a and second 110b sheet surfaces. The opposing sheet side edges 117a and 117b are commonly substantially free of the solid lubricant 114. The lubricated stock sheet 131 generally has from about 3.7 to about 13.9 mg per square meter of a lubricant 114 deposited on the sheet 120.

The first 110a and second 110b sheet surfaces, respectively, can have first and second sheet surface areas. Typically, more than about 95%, more typically, more than about 98%, more typically, more than about 99%, and even more typically, more than about 99.8% of the first and second sheet surface areas are in contact with the solid lubricant 114.

It can be appreciated that the liquefied lubricant is generally applied at a temperature greater than the ambient temperature. Moreover, the lubricant is commonly a solid lubricant at ambient temperature, and is usually deposited (on the stock sheet) in a liquefied state. Typically, the contacting step 144 occurs at a temperature from about 80 to 212 degrees Fahrenheit, more commonly, more commonly from about 100 to 200 degrees Fahrenheit, and even more commonly from about 140 to 195 degrees Fahrenheit. Commonly, the opposing stock sheet edges are substantially free of the liquefied lubricant.

Some embodiments can include a step of supplying thermal energy, step 141, to the one or more pairs of applicators 101. Generally, the thermal energy can be supplied by one or more thermal heating elements 105. The one or more heating elements 105 and the one or more pairs of applicators 101a and 101b, 101r and 101s, and so forth to 101y and 101z can be contained with an enclosure 121. The one or more thermal heating elements 105 can supply sufficient thermal energy to maintain the one or pairs of applicators 101 at a temperature from about 80 to 212 degrees Fahrenheit, more commonly, more commonly from about 100 to 200 degrees Fahrenheit, and even more commonly from about 140 to 195 degrees Fahrenheit. The heating elements 105 can be one of an electrical resistance heating element, a hot water radiant heating element, a stream radiant heating element, a high-pressure steam radiant heating element, a super-critical steam radiant heating element, an infrared heating element, or a hot oil radiant heating element. The enclosure 121 can be one of an insulated enclosure, a non-insulated enclosure, or a combination of insulated and non-insulated portions.

In step 146, the lubricated stock sheet 131 is coil wound to form a roll of the lubricated stock sheet 106.

Some embodiments can include a step of flowing, step 143, the liquefied lubricant 114 from a lubricant-containing vessel 103 to a liquid-dispensing element 118. The step 143 can also include dispensing, from the liquid-dispending element 118, the liquefied lubricant 114 to a perforated applicator element 108 having first 122 and second 123 perforated element surfaces. Moreover, the perforated applicator element 108 can typically be in fluid communication with the porous applicator element 104 having first 124 and second 125 porous element surfaces. Furthermore, the liquefied lubricant can generally flow from the first perforated element surface 122 to the second porous element surface 125 and from the second porous element surface 125 to the first porous element surface 124.

In some embodiments, the stock sheet can commonly be contacted with each pair of the one or more pairs of applicators at a rate of about 50 to about 6,000 feet per minute, more commonly at a rate of about 100 to about 2,000 feet per minute, or even more commonly at a rate of about 400 to about 700 feet per minute.

Figure 9:
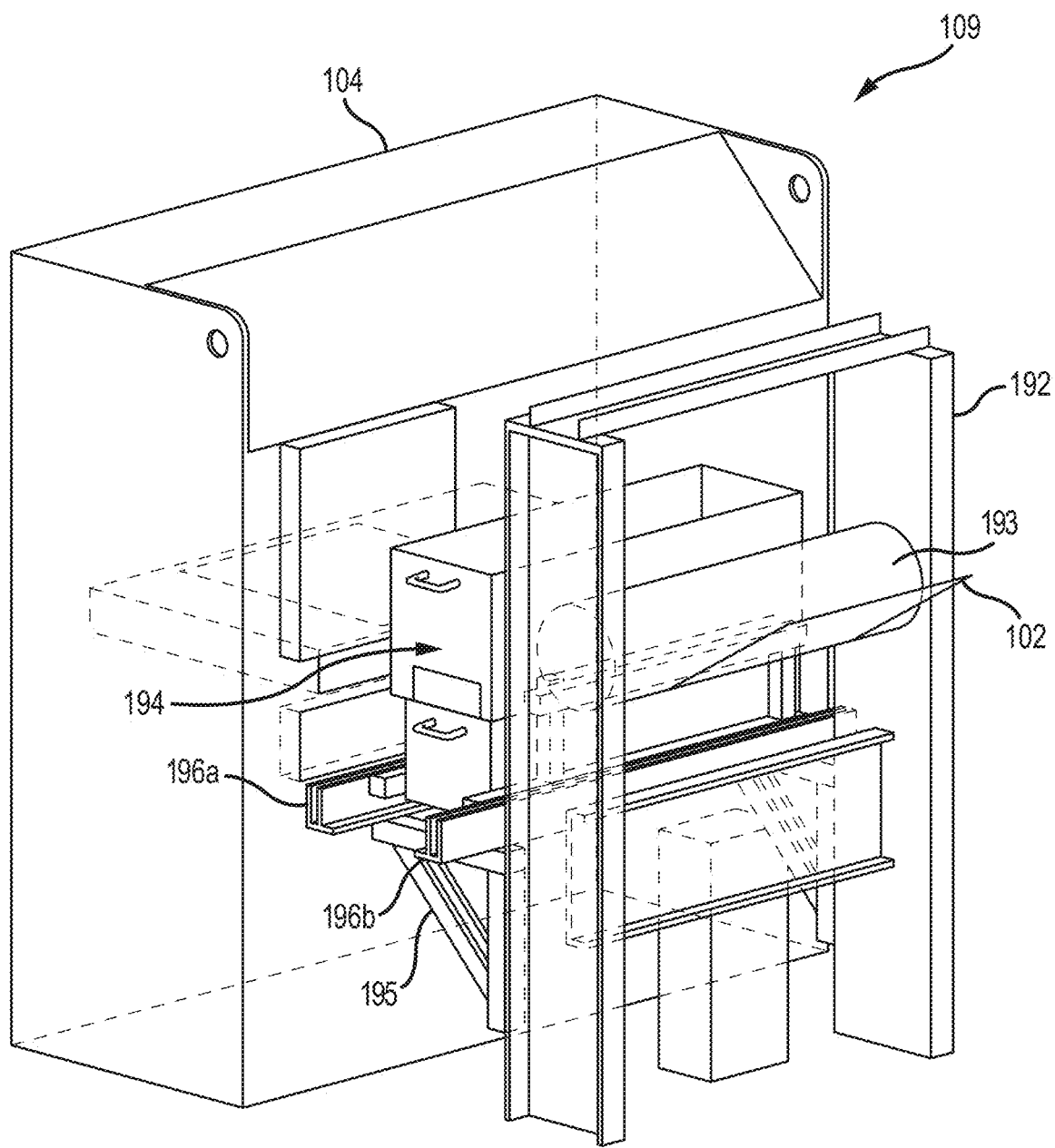
FIG. 9 depicts an exploded view of the component having reference number 194 in FIG. 1.

FIG. 9 depicts in accordance with some embodiments, a sheet lubricant application system 190 in operating position to engage stock sheet 102 between an oiler 191 and a breakdown roll system 192. The oiler 191 can be without limitation a Peabody oiler. The breakdown roll system 192 generally includes a breakdown roller 193.

As can be seen from FIGS. 9, 10 and 11A-11C, the system 190 includes a drawer assembly 194. The drawer assembly 194 is generally positioned within a system mounting 195 by first and second roll caster assemblies 196a and 196b. The drawer assembly 194 can be removed from the system mounting 195 by means of the first and second roll cast assemblies 196a and 196b.

Figure 10:
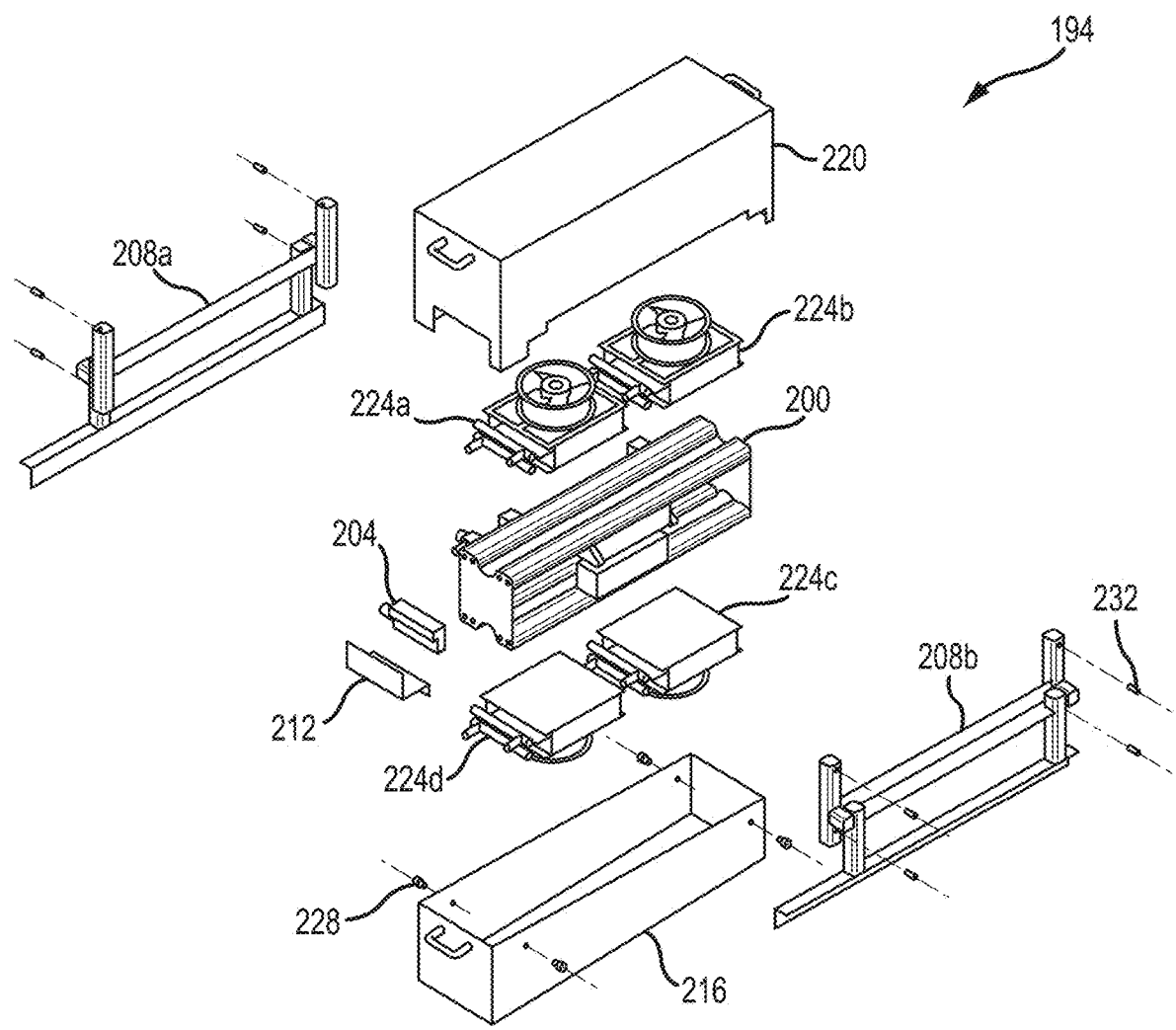
FIG. 10 depicts an exploded view of the component having reference number 194 in FIG. 9.
Figure 11A:
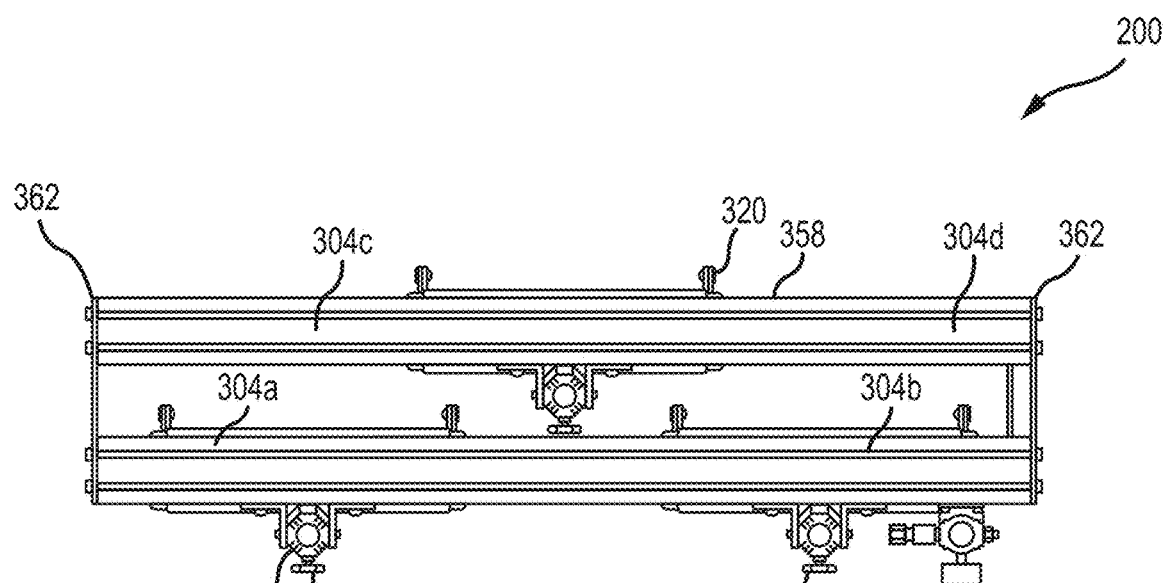
FIGS. 11A-11C depict three perspective views of the component having reference number 200 in FIG. 10.
Figure 11B:
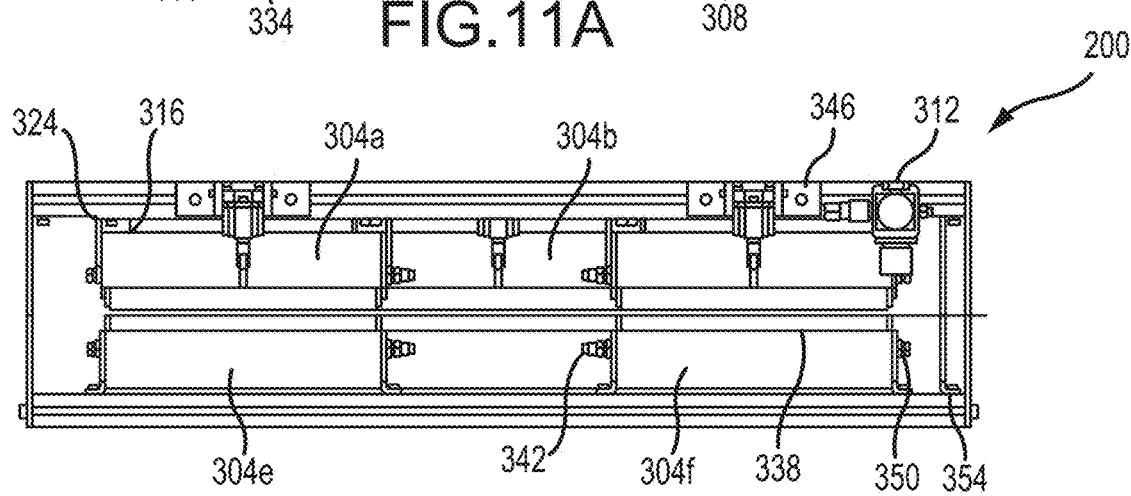
Figure 11C:
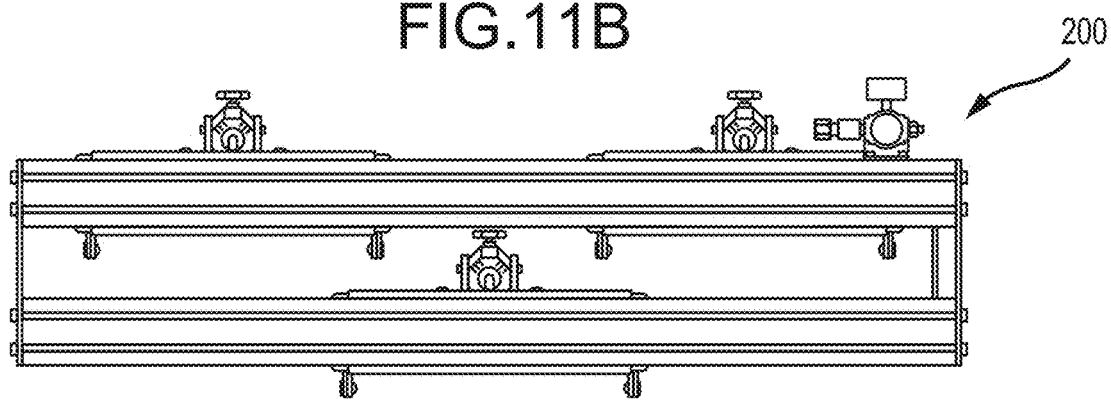

With reference to FIG. 10, the sheet lubricant application system 190 includes an application subassembly 200, valve stack 204, left and right lubricator supports 208a and 208b, bulk head plate 212, heat box bottom 216 of the drawer assembly 194, heat box top 220 of the drawer assembly 194, heat exchanger fan subassemblies 224a, 224b, 224c, and 224d, hex bolt flanges 228, and fasteners 232 and washers 236. The heat exchanger fan subassemblies 224a, 224b, 224c, and 224d with each comprising a fan and heat exchanger tubing (not depicted), whereby air blown by the fans is heated by hot water in the tubing to heat the application subassembly 200 and avoid solidification of the lubricant during application to the sheet. The valve stack comprises fluid flow meters to meter lubricant fluid flow to the application rollers.

With reference to FIGS. 3 and 11A-C, the applicator subassembly 200 includes six roller sub-assemblies 304a-f, a male tee push fitting 308, a pressure regulator assembly 312, an upper roller carrier 316, a pivot replacement pin 320, a pivot bracket 324, an air cylinder assembly 330, a push-in swivel elbow 334, lower roller carrier 338, a dispenser assembly 342, a mounting bracket for the air cylinder 346, a stub shaft with a jam nut 350, a tube guard 354, a T-slot extrusion 358, and a double endplate with cut outs 362. The adjacent roller subassemblies 304 move up and down to adjustably engage the sheet. The pressure regulator assembly 312 measures the pressure applied by each adjacent pair of roller subassemblies to the sheet.

With reference to FIG. 4, each roller subassembly 204 comprises a liquid-dispensing element 118, porous applicator element 104, perforated applicator element 108, roller end caps (which includes the bearing) 112a,b, bearing 116, and stub shaft 120. As can be seen from the assembled cutaway, the liquid-dispensing element 118 passes through the end cap1 112a and 112b and includes orifices 132 along its length to dispense heated liquid lubricant. 114 in liquefied form. The liquid lubricant 114 flows through the perforations in the perforated applicator element 108 to soak the porous applicator element 104, which contacts the stock sheet 102 and applies liquid lubricant 114 to the stock sheet 102 by roll coating techniques under controlled pressure, allowing precise control of the amount of lubricant 114 applied. The opposing pairs of roller subassemblies apply lubricant to opposing surfaces of the stock sheet 102. The porous applicator element 104 is commonly one or more of polyurethane foam, polyester felt, or wool felt.

Figure 12:
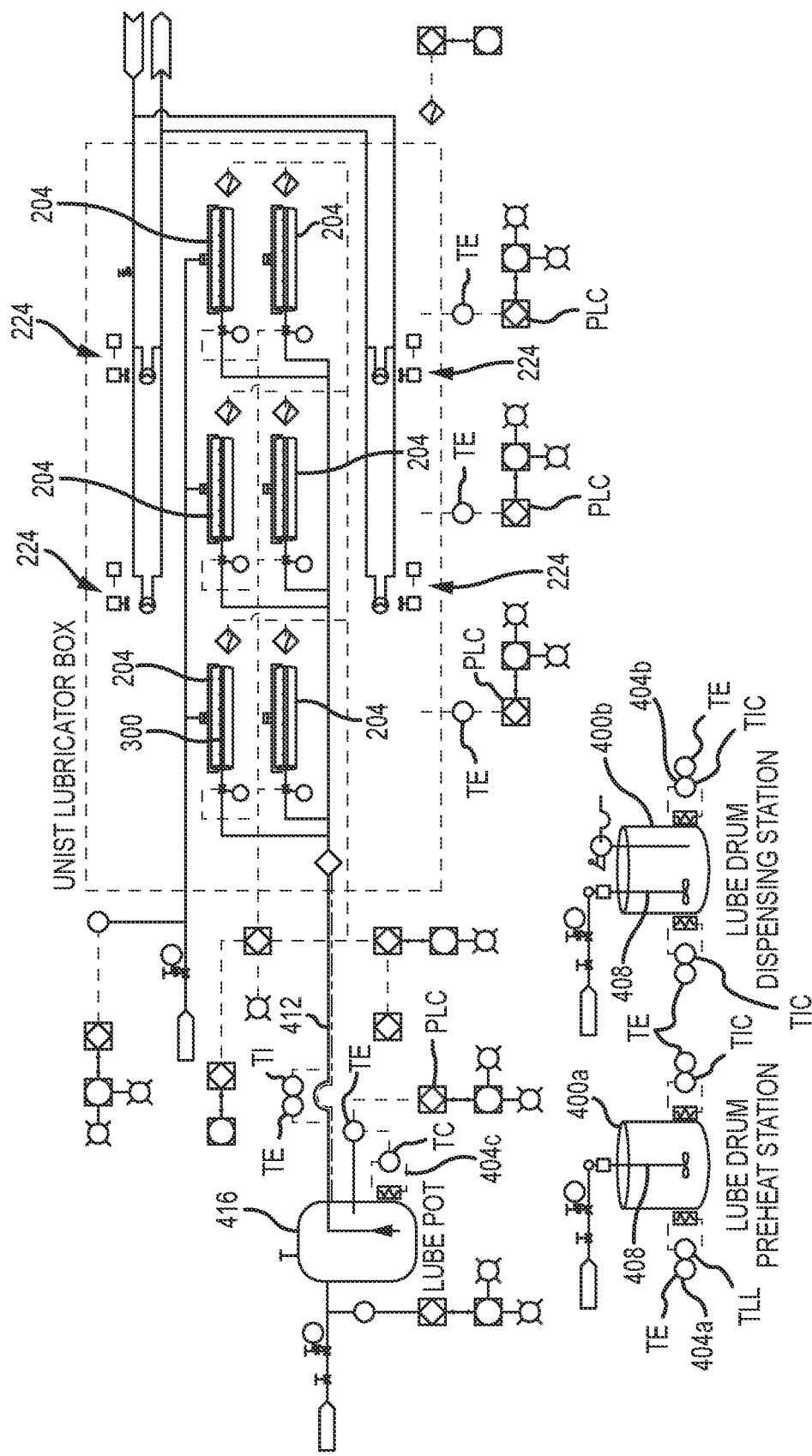
FIG. 12 is a diagram of the device according to some embodiments of the disclosure.
Figure 13:
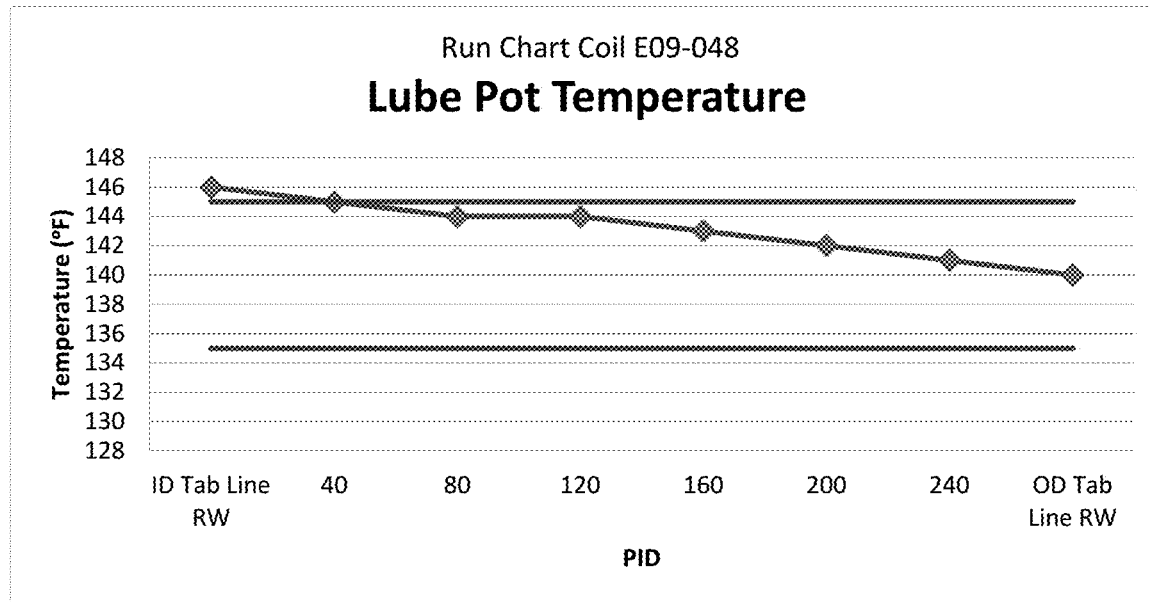
FIG. 13 is a plot of the temperature of lubricant-containing vessel according to Example 2.
Figure 14:
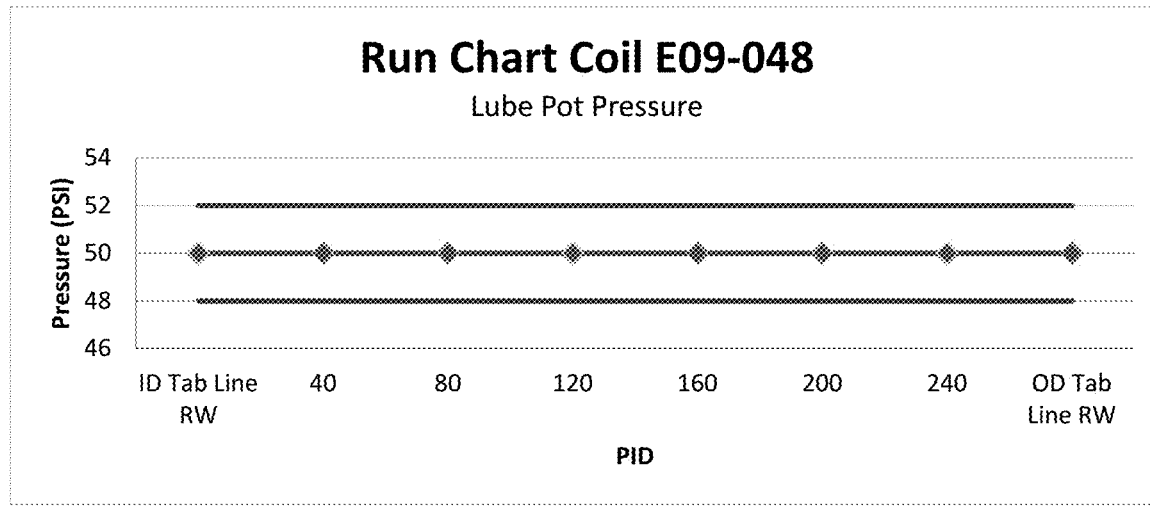
FIG. 14 is a plot of the pressure of lubricant-containing vessel according to Example 2.
Figure 15:
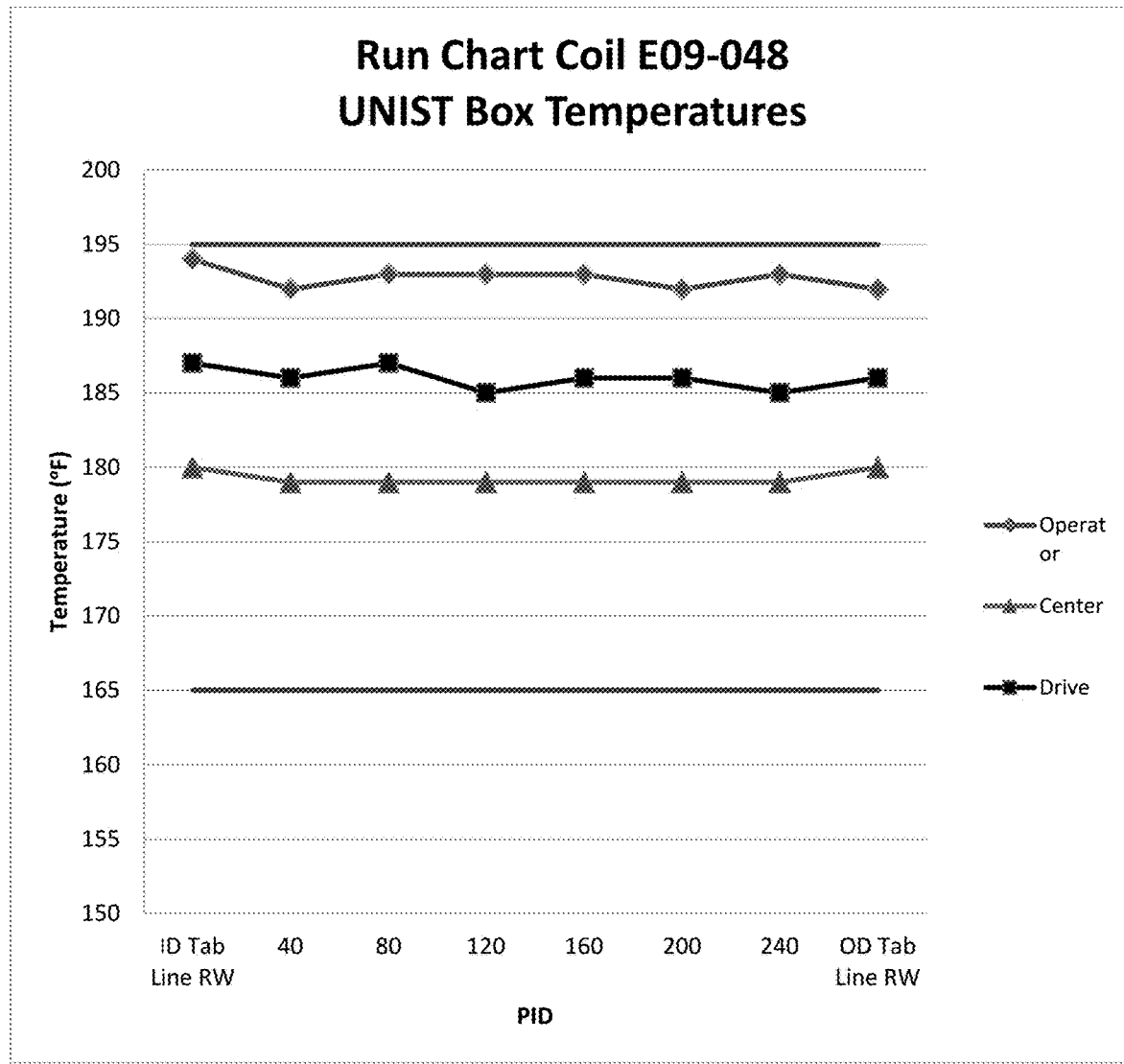
FIG. 15 is a plot of the temperature of various device components contained with the enclosure according to Example 2.
Figure 16:
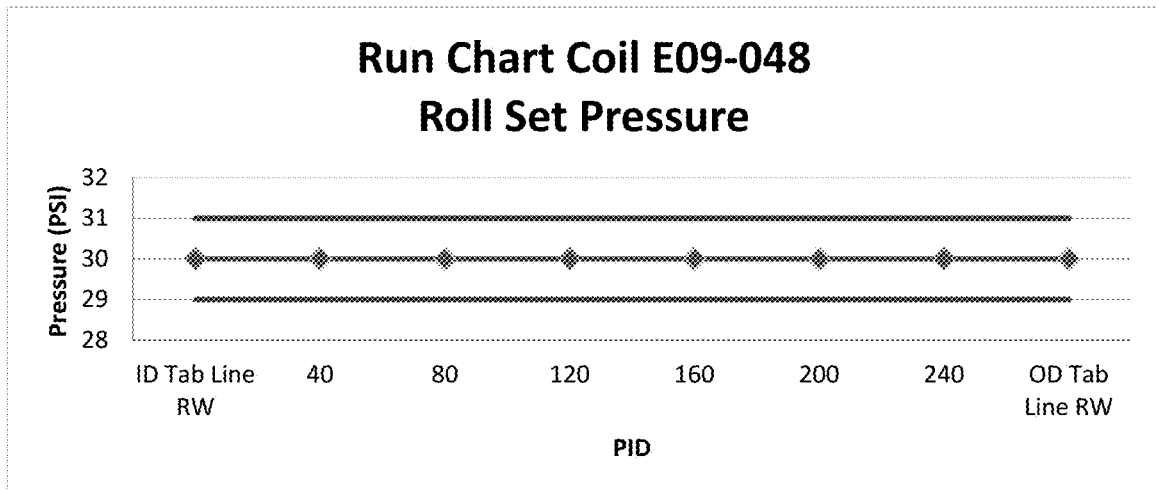
FIG. 16 is a plot of the applicator pressure according to Example 2.

With reference to FIG. 12, the control circuitry and ancillary equipment for the lubricant application system 190 is depicted. The lubricant application system 190 comprises first and second lubricant heating vessels 400a,b, which heat and melt the solid lubricant by means of heating assemblies 404. The heated lubricant is mixed by impellers 408. The heated lubricant is transported to the lube dispensing vessel 416, which is also heated by a heating assembly 404. Under the pressure of air, the heated liquid lubricant passes pneumatically along heated lube process piping 412 to the lubricant injectors 300 for introduction into the roller subassemblies 204.

The control circuitry includes the following components: electrical supply (ES), flow controller (FC), timer alarm high (KAH), pressure indicator (PI), pressure alarm high (PAH), pressure alarm low (PAL), pressure transmitter (PT), solenoid valve (SOV), temperature element (TE), temperature indicator (TI) (such as a thermocouple), temperature indicating controller (TIC), temperature controller (TC), temperature alarm high (TAH), programmable logic circuit (PLC) (that receives temperature measurements from the lube pot, operating box, center box, and drive box TEs) and temperature alarm low (TAL). Other component types include lube process piping, water supply, pneumatic signal (line), electrical signal (line), ethernet connection, manual valve, solenoid valve, self-relieving pressure regulator (with manually adjustable set point), motor, heating element, manual pressure relief valve, fan, filter, and visual alarm (showing alarm type designator and alarm set point value).

Control subassemblies include for the first and second lubricant heating vessels 400a,b, and lube dispensing vessel 416 include a temperature controller and temperature element pairing to monitor the temperature of the lubricant.

Control subassembly for the heated lube process piping 412 temperature controller and temperature element to monitor piping temperature (and avoid lubricant solidification in the piping during pneumatic transport.

Control subassemblies for each of the roller subassemblies 204 include a proximity sensor (to detect roller subassembly speed or rotation rate to shut down automatically the device in the event of a rate above or below set thresholds) and solenoid valves to shut down the flow of liquid lubricant in the event of system malfunction or shut down. A temperature element and control can be engaged with the lubricant supply to or within each roller subassembly 204 to shut down automatically the device in the event a measured temperature between a first and second roller subassemblies exceeds a set threshold.

The drawer assembly 194 is engaged with a proximity sensor to determine when the drawer assembly 194 is not in a proper (operative) position. When the proximity sensor detects that the drawer assembly 194 is in an improper position, the system is rendered inoperative.

The lubricant typically has a melt point typically no more than about 250% above, more typically no more than about 200% above, more typically no more than about 150% above, and even more typically no more than about 100% above ambient temperature. In one application, the lubricant has a melt point at or slightly above (typically no more than about 35% above and more typically no more than about 25% above) ambient temperature. In one application, the melt point of the lubricant ranges from ambient temperature (or slightly above room temperature) commonly from about 80 to 212 degrees Fahrenheit, more commonly, more commonly from about 100 to 200 degrees Fahrenheit, and even more commonly from about 140 to 195 degrees Fahrenheit. Ambient temperature typically ranges from about 12 to about 3 and more typically from about 18 to about 27 degrees Celsius. The lubricant can be any oil, soluble oil, semisynthetic, and dry-film. In addition to having good lubricity, lubricants should be easily removable from the formed sheet, because the can body has to be completely oil-free for painting. Therefore, in selection/evaluation of stamping lubricants, one should consider advantages and disadvantages of lubricants not only for deep drawing but also for assembly and painting operations. Examples of suitable lubricants include AMCO5157™, Quakerol Pre Lube™, AMCO5357™, and O4C-172™.

In one configuration, the sheet lubricant application system 190 can be set to apply, to each of the upper and lower surfaces of the sheet, about 150±10 mg/foot$^2$ of lubricant, more commonly about 100±10 mg/foot$^2$ of lubricant, even more commonly about 80±10 mg/foot$^2$ of lubricant, and even more commonly about 90±10 mg/foot$^2$ of lubricant.

EXPERIMENTAL

The following examples are provided to illustrate certain aspects, embodiments, and configurations of the disclosure and are not to be construed as limitations on the disclosure, as set forth in the appended claims. All parts and percentages are by weight unless otherwise specified.

Three different lubricants (I, II, and III) were applied to a standard aluminum can stock sheet according to the above methods and sample at ten different locations on the coil wound coil. Table 1 shows that the lubricant was substantially uniformly distributed on the stock sheet.

TABLE 1

| Lubricant | Cut (lubricant weights mg/ft$^2$) | | | | | | | | | |
|---|---|---|---|---|---|---|---|---|---|---|
| | 1 | 2 | 3 | 4 | 5 | 6 | 7 | 8 | 9 | 10 |
| I | 63 | 60 | 65 | 58 | 55 | 60 | 61 | 67 | 69 | 65 |
| II | 67 | 61 | 59 | 62 | 49 | 47 | 55 | 66 | 70 | 64 |
| IIIA | 58 | 58 | 52 | 47 | 48 | 44 | 60 | 53 | 55 | 57 |
| IIIB | 59 | 68 | 66 | 70 | 61 | 60 | 60 | 65 | 56 | 62 |

Example 2

Lubricant was applied to a standard aluminum can stock sheet according to the process parameters of Table 2. FIGS. 13-16 show that the lubricant-containing vessel temperature and pressure and the applicator temperature and pressure can be substantially controlled in the above-identified process.

Example 3

Figure 17:
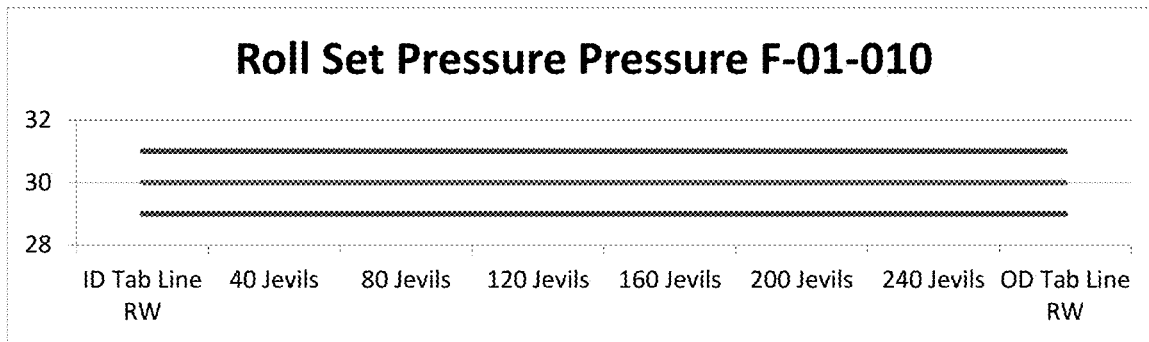
FIG. 17 is plot of the applicator pressure according to Example 3.
Figure 18:
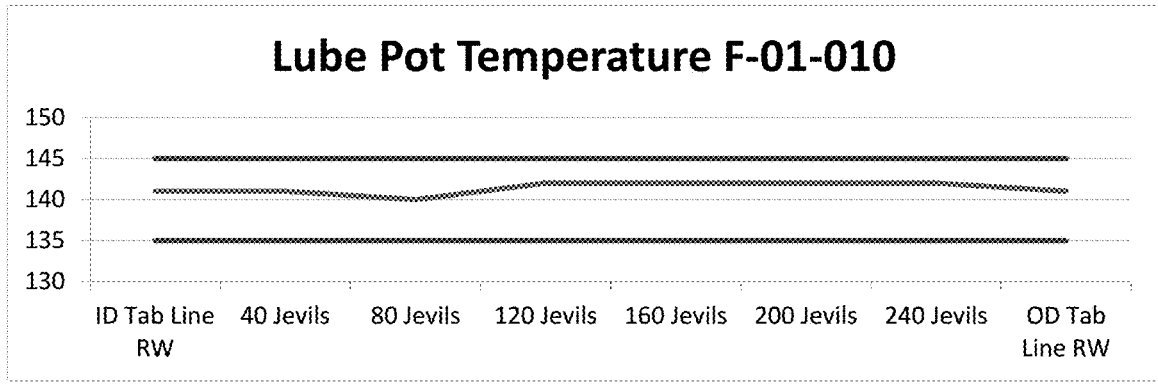
FIG. 18 is a plot of the temperature of lubricant-containing vessel according to Example 3.
Figure 19:
FIG. 19 is a plot of the of the pressure of lubricant-containing vessel according to Example 3.

Lubricant was applied to a standard aluminum can stock sheet according to the process parameters of Table 3. FIGS. 17-19 show that the lubricant-containing vessel temperature and pressure and the applicator pressure can be substantially controlled in the above-identified process.

Example 4

Figure 20:
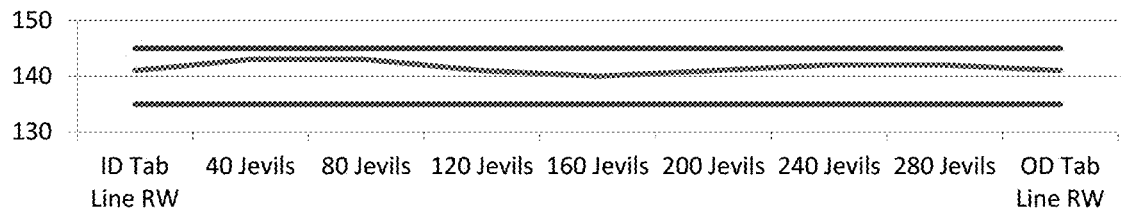
FIG. 20 is a plot of the of the temperature of lubricant-containing vessel according to Example 4.
Figure 21:
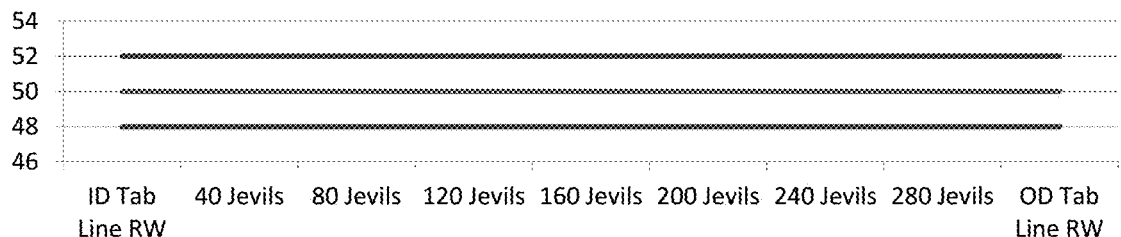
FIG. 21 is a plot of the of the pressure of lubricant-containing vessel according to Example 4.
Figure 22:
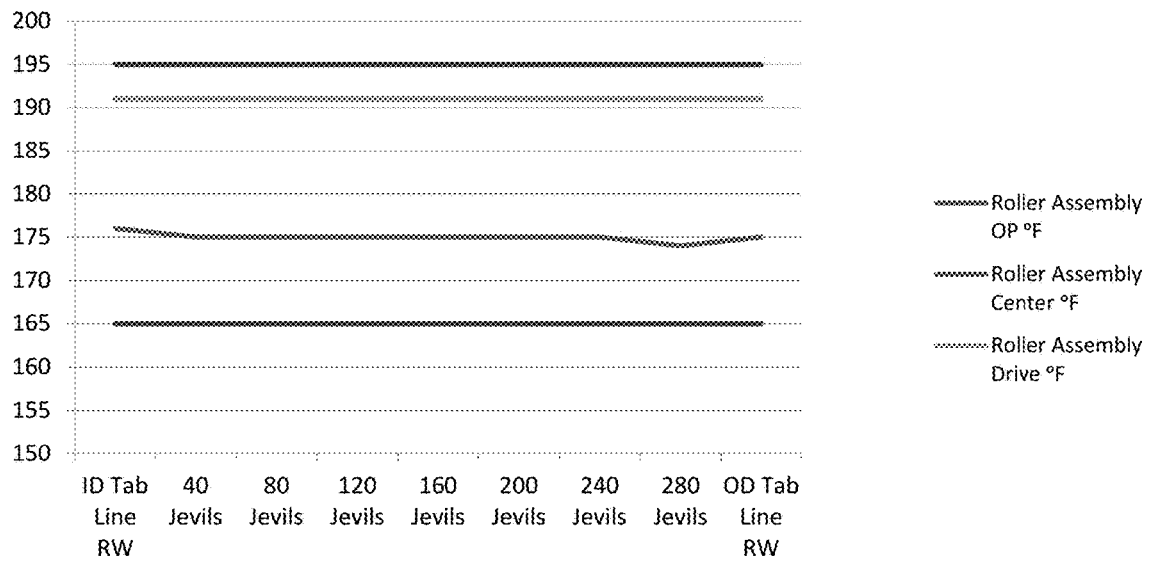
FIG. 22 is a plot of the temperature of various device components contained with the enclosure according to Example 4.
Figure 23:
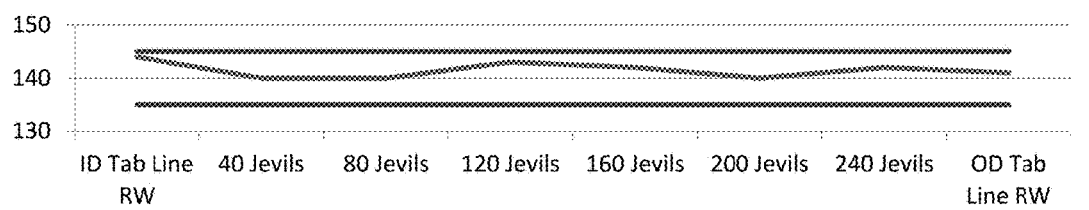
FIG. 23 is a plot of the of the temperature of lubricant-containing vessel according to Example 5.
Figure 24:
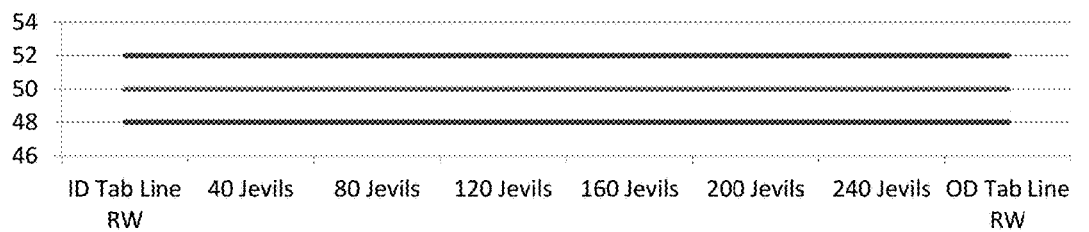
FIG. 24 is a plot of the of the pressure of lubricant-containing vessel according to Example 5.
Figure 25:
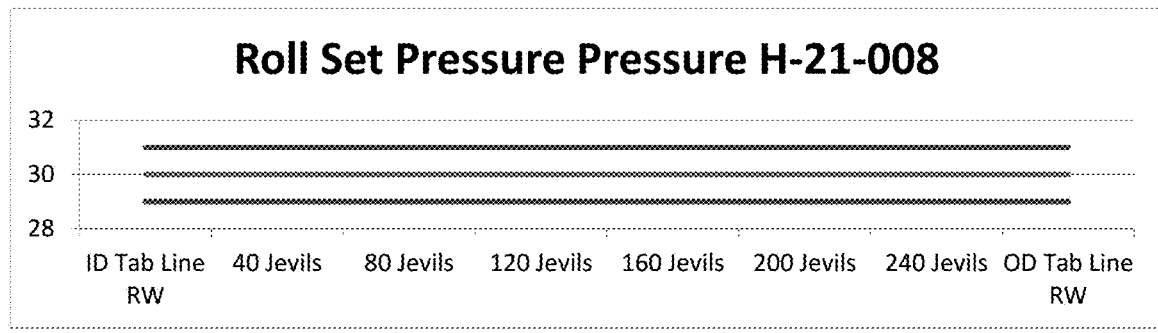
FIG. 25 is a plot of the of the pressure of applicators according to Example 5.
Figure 26:
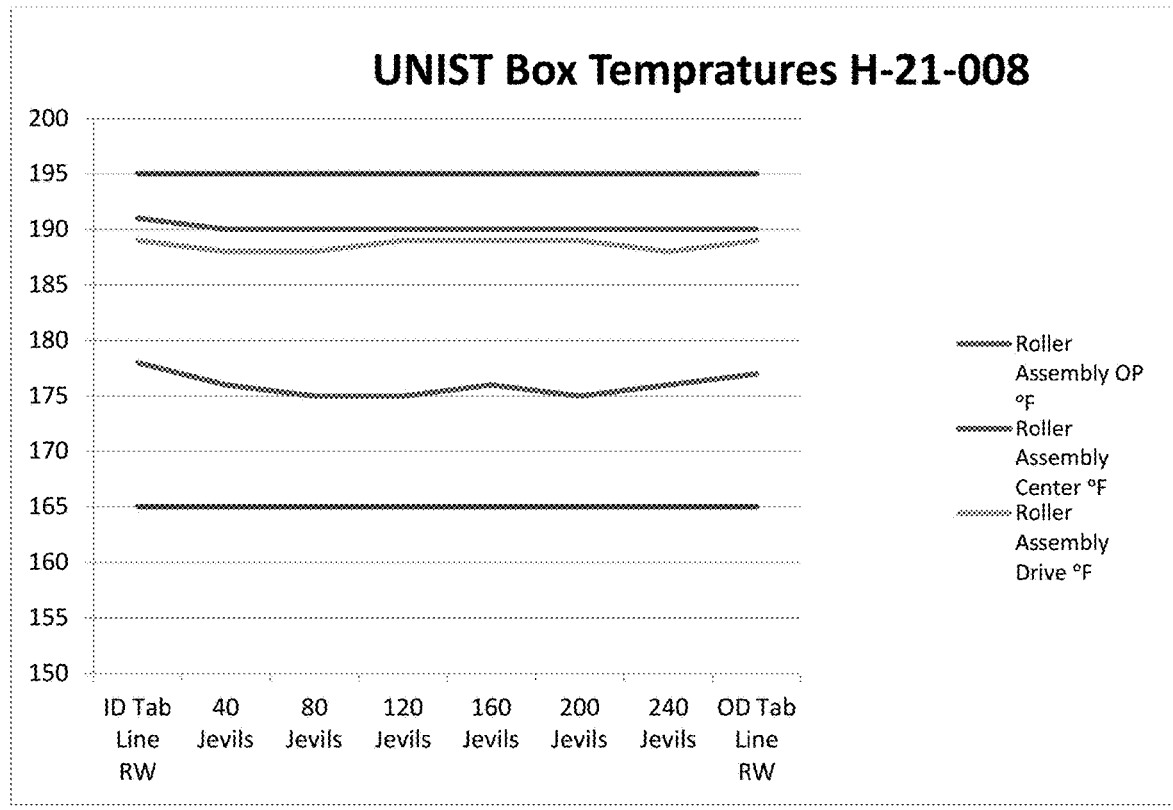
FIG. 26 is a plot of the temperature of various device components contained with the enclosure according to Example 5.
Figure 27:
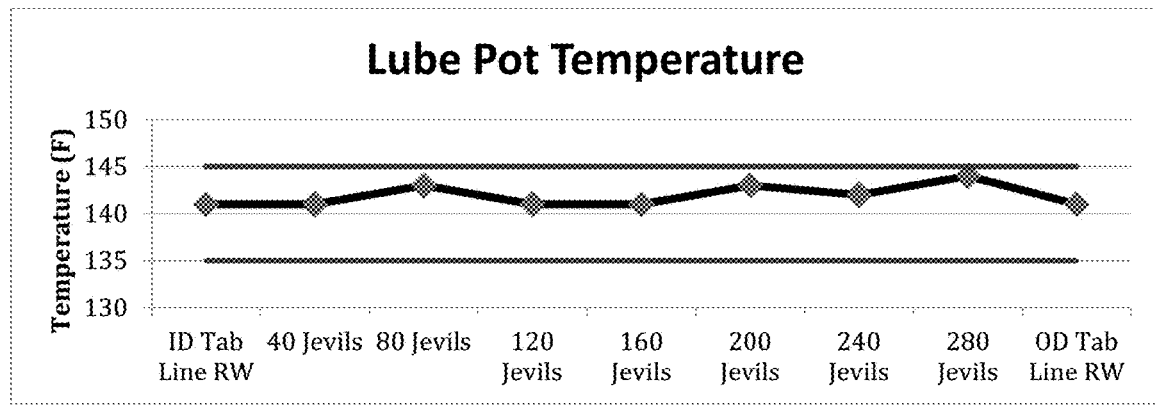
FIG. 27 is a plot of the of the temperature of lubricant-containing vessel according to Example 6.
Figure 28:
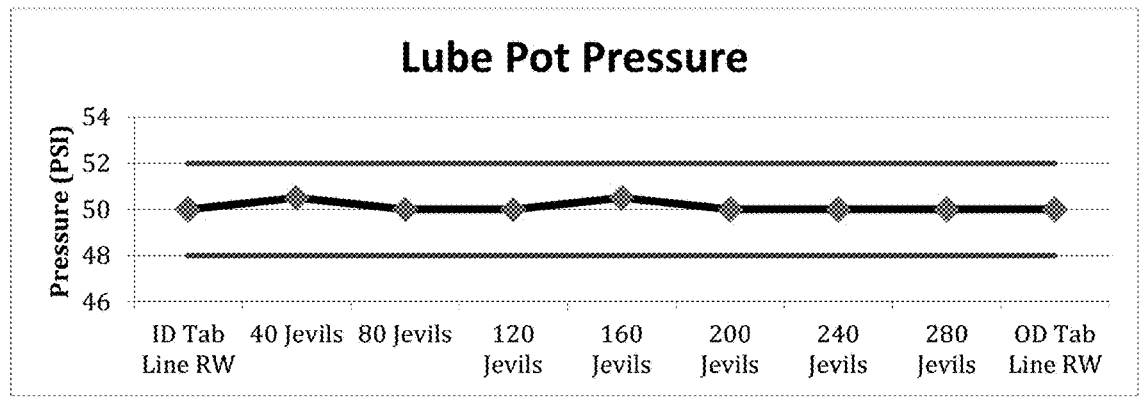
FIG. 28 is a plot of the of the pressure of lubricant-containing vessel according to Example 6.
Figure 29:
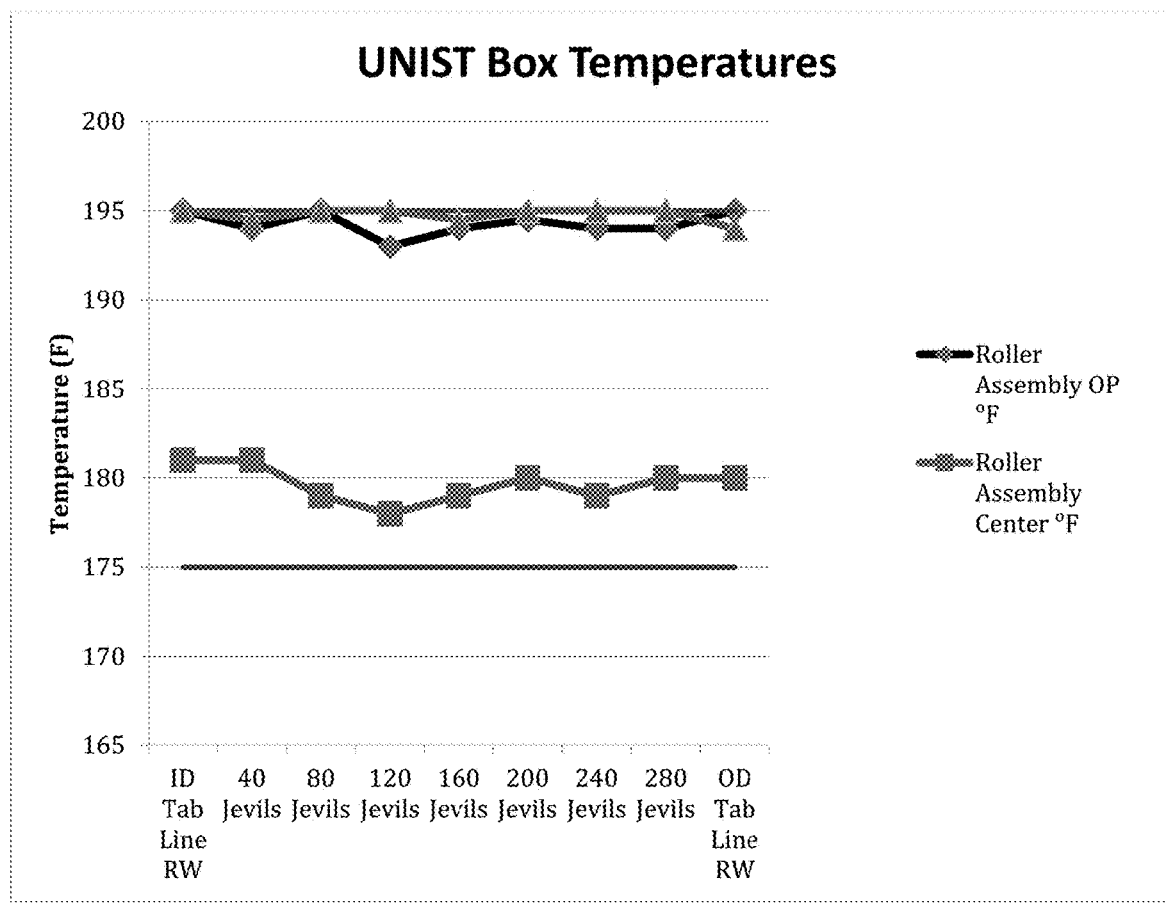
FIG. 29 is a plot of the temperature of various applicators contained with the enclosure according to Example 6.
Figure 30:
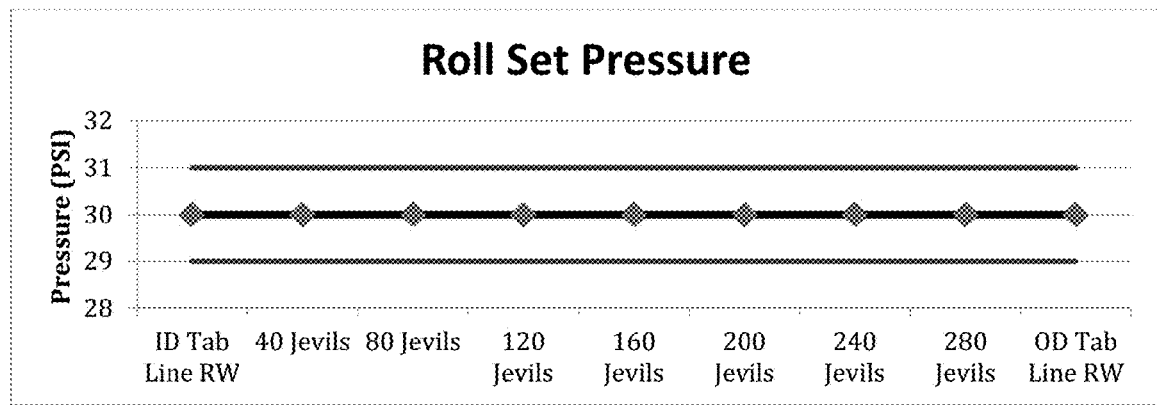
FIG. 30 is a plot of the applicator set temperature according to Example 6.
Figure 31:
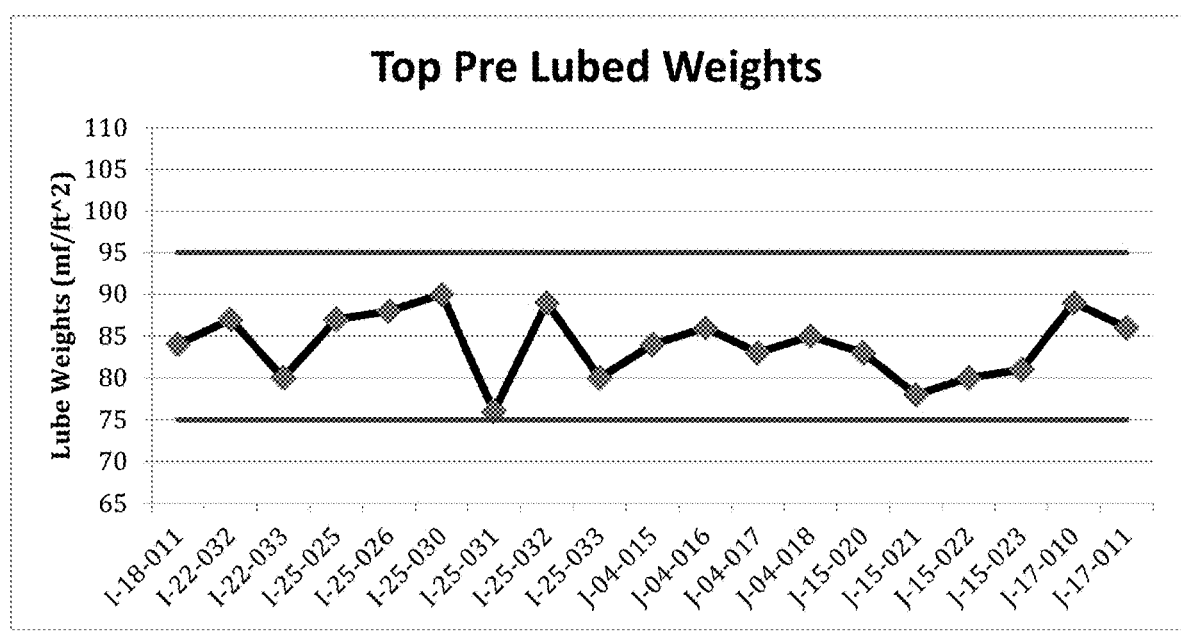
FIG. 31 is a plot of the top prelubrication weights according to Example 6.
Figure 32:
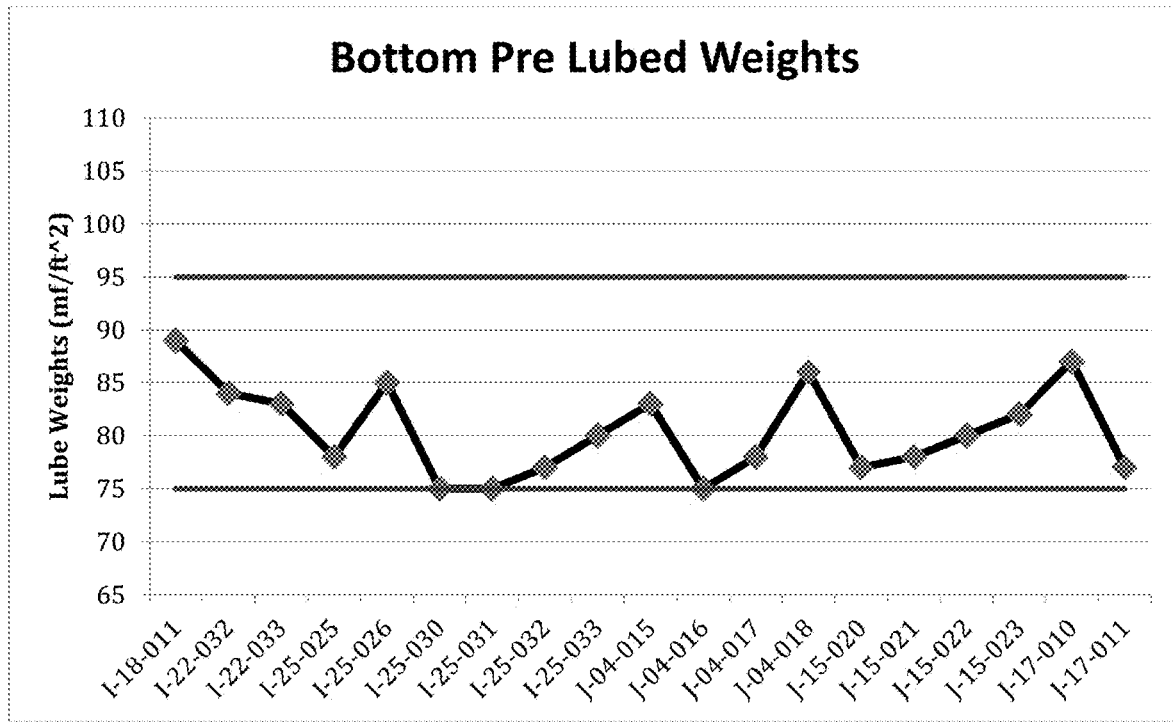
FIG. 32 is a plot of the bottom prelubrication weights according to Example 6.
Figure 33:
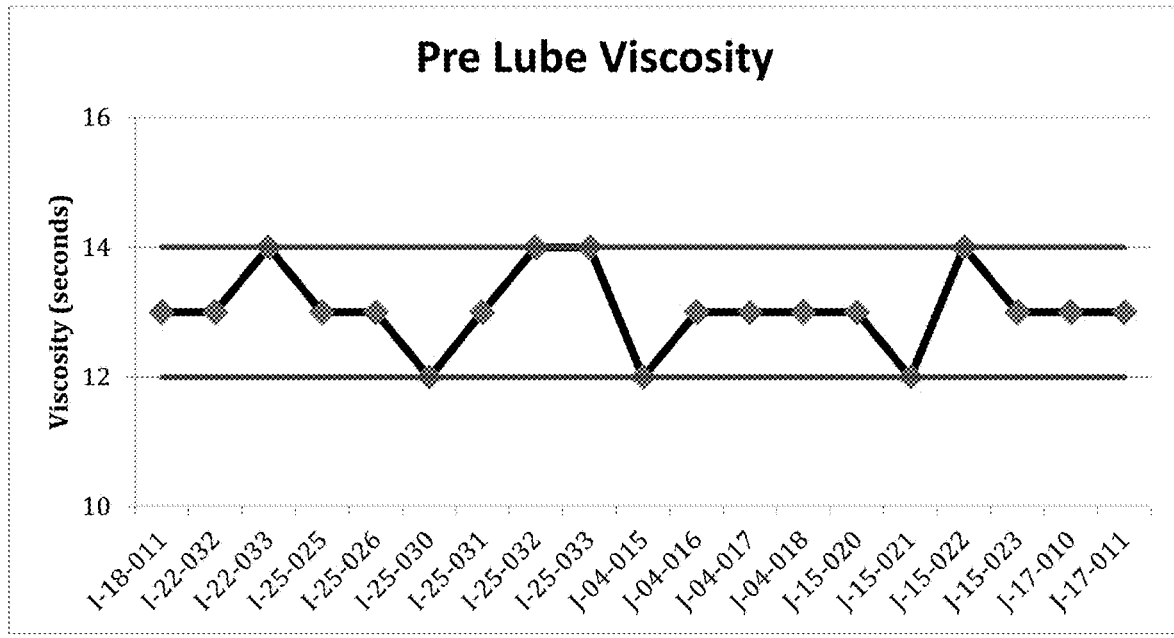
FIG. 33 is a plot of the prelubrication viscosity according to Example 6.
Figure 34:
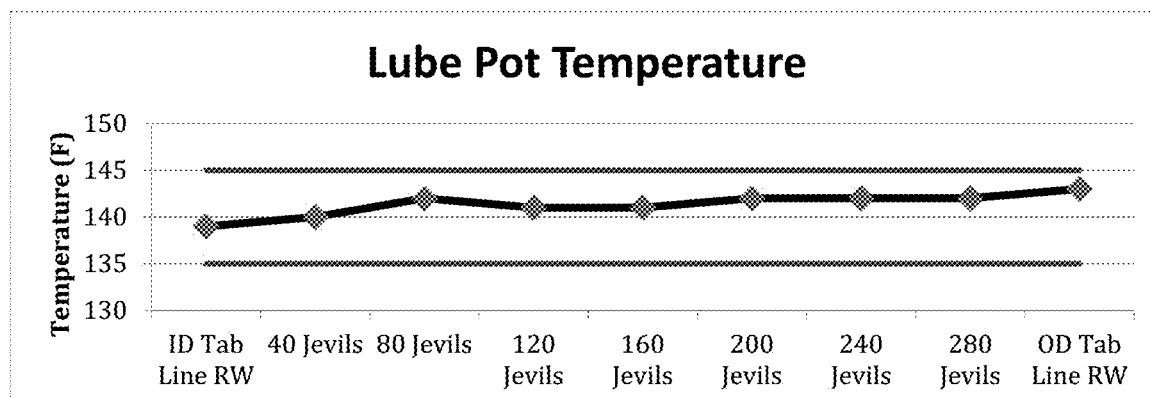
FIG. 34 is a plot of the of the temperature of lubricant-containing vessel according to Example 7.
Figure 35:
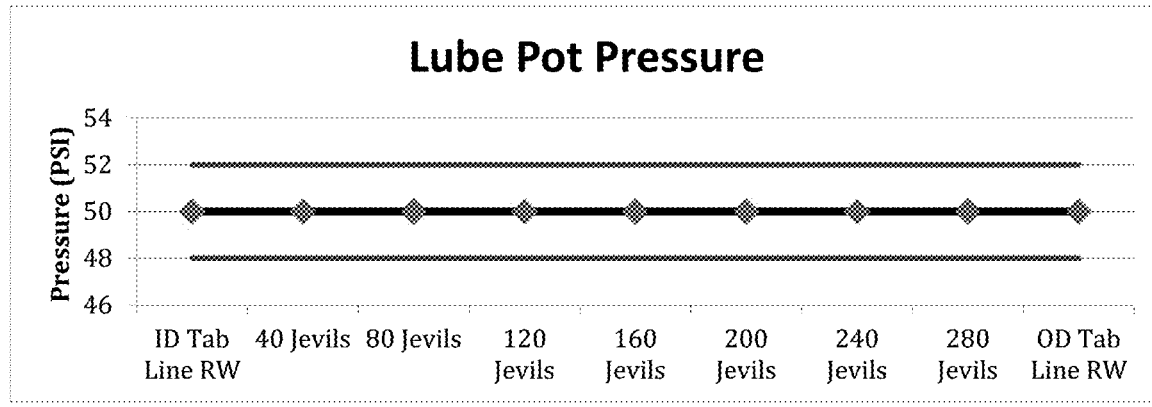
FIG. 35 is a plot of the of the pressure of lubricant-containing vessel according to Example 7.
Figure 36:
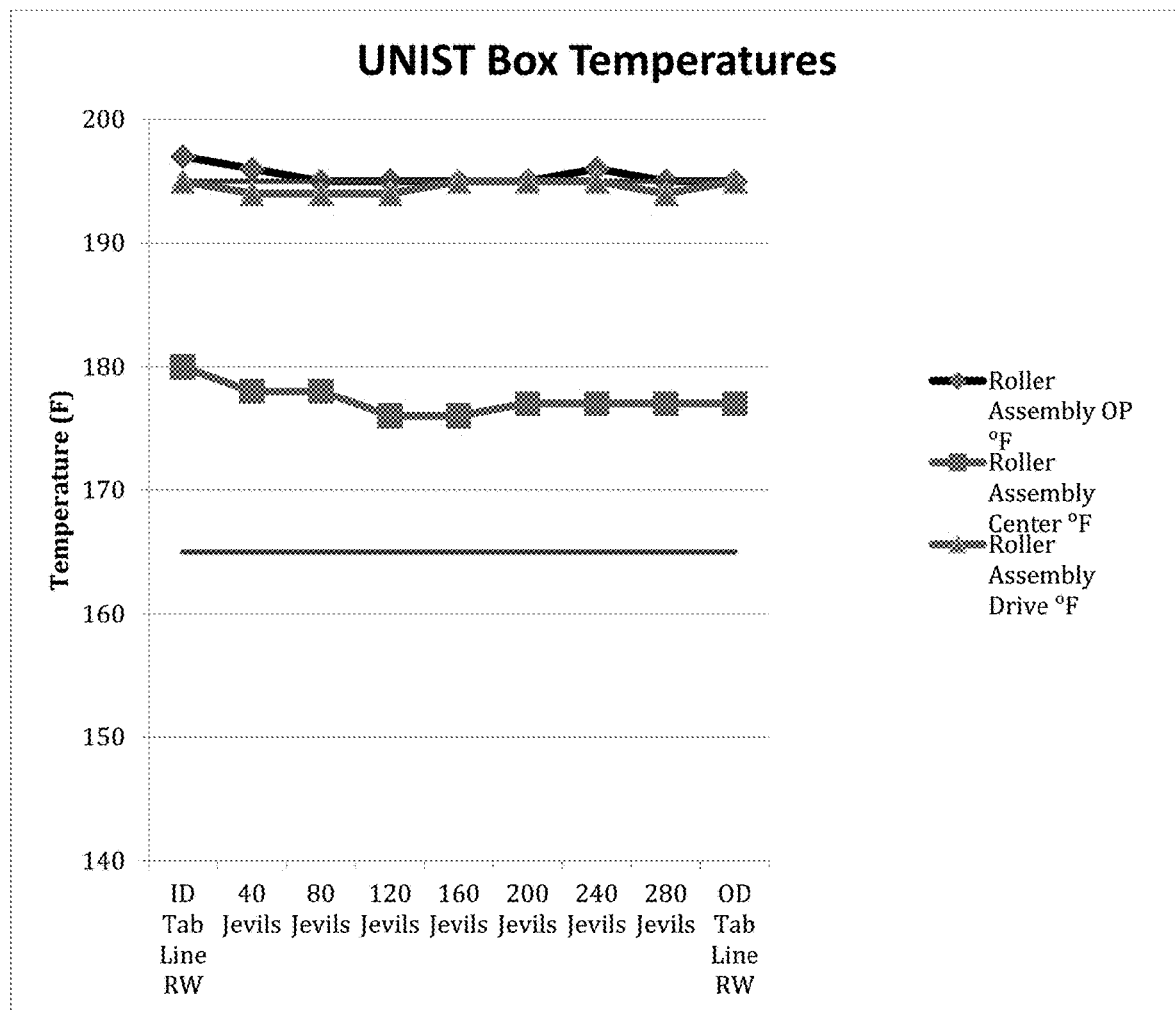
FIG. 36 is a plot of the temperature of various applicators contained with the enclosure according to Example 7.
Figure 37:
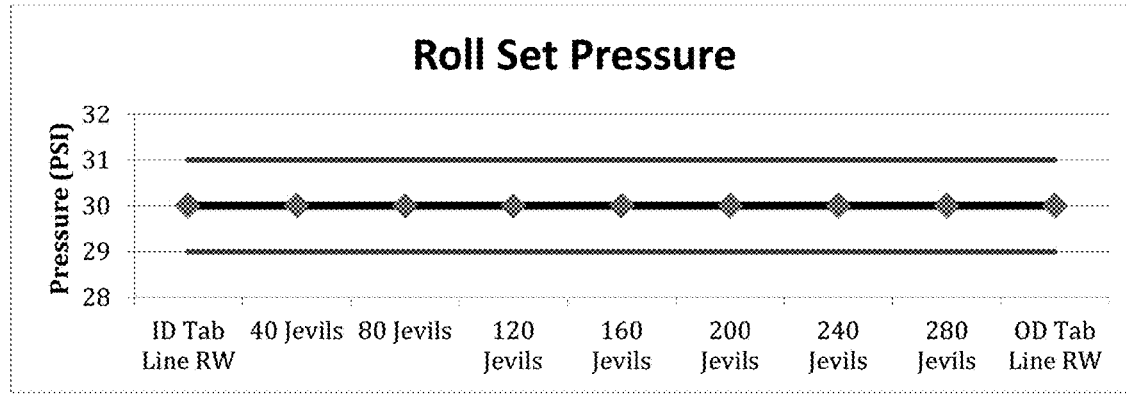
FIG. 37 is a plot of the applicator set pressure according to Example 7.
Figure 38:
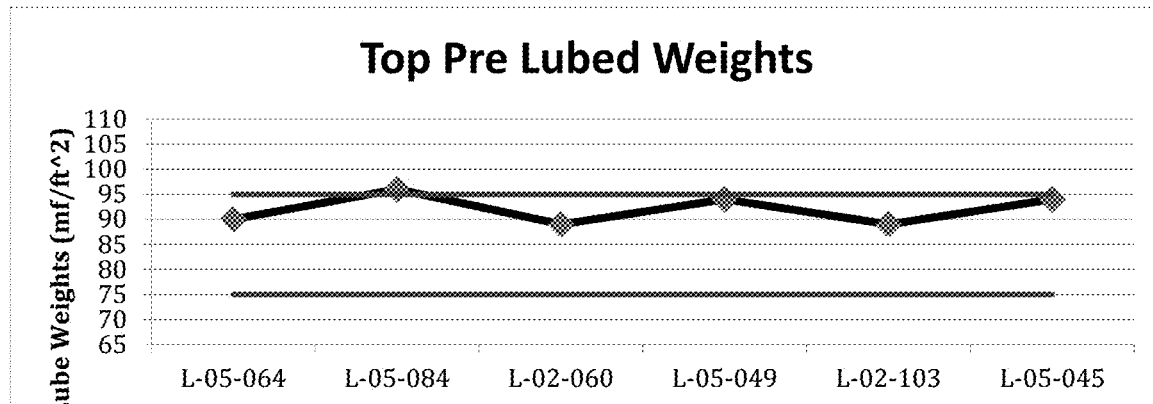
FIG. 38 is a plot of the top prelubrication weights according to Example 7.
Figure 39:
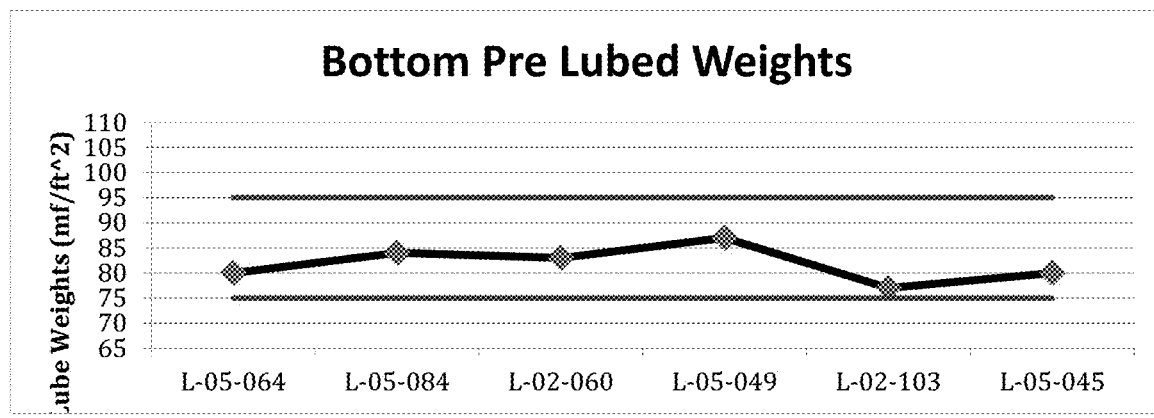
FIG. 39 is a plot of the bottom prelubrication weights according to Example 7.
Figure 40:
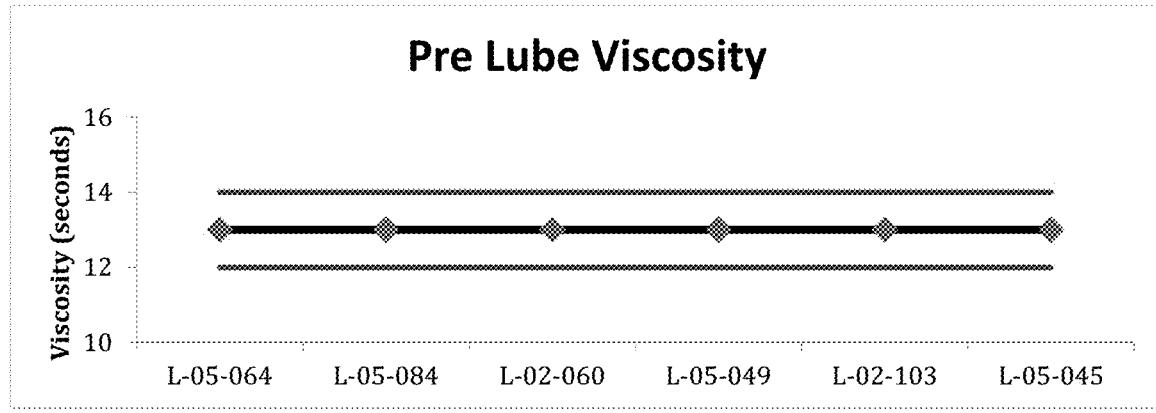
FIG. 40 is a plot of the prelubrication viscosity according to Example 7.

Lubricant was applied to a standard aluminum can stock sheet according to the process parameters of Table 4. FIGS. 20-22 show that the lubricant-containing vessel temperature and pressure and the temperature within the enclosure can be substantially controlled in the above-identified process.

Example 5

Lubricant was applied to a standard aluminum can stock sheet according to the process parameters of Table 5. FIGS. 23-26 show that the lubricant-containing vessel temperature and pressure and the applicator temperature at various locations and pressure can be substantially controlled in the above-identified process.

Example 6

Lubricant was applied to a standard aluminum can stock sheet according to the Lubricant was applied to a standard aluminum can stock sheet according to the process parameters of Table 6. FIGS. 27-35 show that the lubricant-containing vessel temperature and pressure, the applicator temperature at various locations and pressure, lubricant viscosity, and amount of lubricant deposited on opposing sides of the stock sheet can all be substantially controlled in the above-identified process.

Example 7

Lubricant was applied to a standard aluminum can stock sheet according to the Lubricant was applied to a standard aluminum can stock sheet according to the process parameters of Table 7. FIGS. 34-40 show that the lubricant-containing vessel temperature and pressure, the applicator temperature at various locations and pressure, lubricant viscosity, and amount of lubricant deposited on opposing sides of the stock sheet can all be substantially controlled in the above-identified process.

A number of variations and modifications of the disclosure can be used. It would be possible to provide for some features of the disclosure without providing others.

TABLE 2

| Process Conditions | Fractional Distance from Start to End of Spiral Wound Roll | | | | | | | | |
|---|---|---|---|---|---|---|---|---|---|
| | start | 1/8 | 1/4 | 3/8 | 1/2 | 5/8 | 3/4 | 7/8 | end |
| Lube Pot ° F. | 146 | 145 | 144 | 144 | 143 | 142 | 141 | 140 | 146 |
| Lube Pot PSI | 50 | 50 | 50 | 50 | 50 | 50 | 50 | 50 | 50 |
| Roller Assembly OP ° F. | 194 | 192 | 193 | 193 | 193 | 192 | 193 | 192 | 194 |
| Roller Assembly Center ° F. | 180 | 179 | 179 | 179 | 179 | 179 | 179 | 180 | 180 |
| Roller Assembly Drive ° F. | 187 | 186 | 187 | 185 | 186 | 186 | 185 | 186 | 187 |
| Roll Set PSI | 30 | 30 | 30 | 30 | 30 | 30 | 30 | 30 | 30 |

TABLE 3

| Process Conditions | Fractional Distance from Start to End of Spiral Wound Roll | | | | | | | | |
|---|---|---|---|---|---|---|---|---|---|
| | start | 1/8 | 1/4 | 3/8 | 1/2 | 5/8 | 3/4 | 7/8 | end |
| Lube Pot ° F. | 141 | 141 | 140 | 142 | 142 | 142 | 142 | 141 | 141 |
| Lube Pot PSI | 50 | 50 | 50 | 50 | 50 | 50 | 50 | 50 | 50 |
| Roller Assembly OP ° F. | 192 | 191 | 191 | 191 | 191 | 191 | 191 | 191 | 192 |
| Roller Assembly Center ° F. | 178 | 178 | 177 | 178 | 178 | 178 | 178 | 178 | 178 |

TABLE 3-continued

| Process Conditions | Fractional Distance from Start to End of Spiral Wound Roll | | | | | | | | |
|---|---|---|---|---|---|---|---|---|---|
| | start | 1/8 | 1/4 | 3/8 | 1/2 | 5/8 | 3/4 | 7/8 | end |
| Roller Assembly Drive ° F. | 192 | 192 | 191 | 192 | 191 | 191 | 191 | 191 | 192 |
| Roll Set PSI | 30 | 30 | 30 | 30 | 30 | 30 | 30 | 30 | 30 |

TABLE 4

| Process Conditions | Fractional Distance from Start to End of Spiral Wound Roll | | | | | | | | |
|---|---|---|---|---|---|---|---|---|---|
| | start | 1/8 | 1/4 | 3/8 | 1/2 | 5/8 | 3/4 | 7/8 | end |
| Lube Pot ° F. | 141 | 143 | 143 | 141 | 140 | 141 | 142 | 142 | 141 |
| Lube Pot PSI | 50 | 50 | 50 | 50 | 50 | 50 | 50 | 50 | 50 |
| Roller Assembly OP ° F. | 191 | 191 | 191 | 191 | 191 | 191 | 191 | 191 | 191 |
| Roller Assembly Center ° F. | 176 | 175 | 175 | 175 | 175 | 175 | 175 | 174 | 175 |
| Roller Assembly Drive ° F. | 191 | 191 | 191 | 191 | 191 | 191 | 191 | 191 | 191 |
| Roll Set PSI | 30 | 30 | 30 | 30 | 30 | 30 | 30 | 30 | 30 |

TABLE 5

| Process Conditions | Fractional Distance from Start to End of Spiral Wound Roll | | | | | | | | |
|---|---|---|---|---|---|---|---|---|---|
| | start | 1/8 | 1/4 | 3/8 | 1/2 | 5/8 | 3/4 | 7/8 | end |
| Lube Pot ° F. | 144 | 140 | 140 | 143 | 142 | 140 | 142 | 141 | 144 |
| Lube Pot PSI | 50 | 50 | 50 | 50 | 50 | 50 | 50 | 50 | 50 |
| Roller Assembly OP ° F. | 191 | 190 | 190 | 190 | 190 | 190 | 190 | 190 | 191 |
| Roller Assembly Center ° F. | 178 | 176 | 175 | 175 | 176 | 175 | 176 | 177 | 178 |
| Roller Assembly Drive ° F. | 189 | 188 | 188 | 189 | 189 | 189 | 188 | 189 | 189 |
| Roll Set PSI | 30 | 30 | 30 | 30 | 30 | 30 | 30 | 30 | 30 |

TABLE 6

| Process Conditions | Fractional Distance from Start to End of Spiral Wound Roll | | | | | | | | |
|---|---|---|---|---|---|---|---|---|---|
| | start | 1/8 | 1/4 | 3/8 | 1/2 | 5/8 | 3/4 | 7/8 | end |
| Lube Pot ° F. | 141 | 141 | 143 | 141 | 141 | 143 | 142 | 144 | 141 |
| Lube Pot PSI | 50 | 50.5 | 50 | 50 | 50.5 | 50 | 50 | 50 | 50 |
| Roller Assembly OP ° F. | 195 | 194 | 195 | 193 | 194 | 194.5 | 194 | 194 | 195 |
| Roller Assembly Center ° F. | 181 | 181 | 179 | 178 | 179 | 180 | 179 | 180 | 180 |
| Roller Assembly Drive ° F. | 195 | 194.5 | 195 | 195 | 194.5 | 195 | 195 | 195 | 194 |
| Roll Set PSI | 30 | 30 | 30 | 30 | 30 | 30 | 30 | 30 | 30 |

TABLE 7

| Process Conditions | Fractional Distance from Start to End of Spiral Wound Roll | | | | | | | | |
|---|---|---|---|---|---|---|---|---|---|
| | start | 1/8 | 1/4 | 3/8 | 1/2 | 5/8 | 3/4 | 7/8 | end |
| Lube Pot ° F. | 139 | 140 | 142 | 141 | 141 | 142 | 142 | 142 | 143 |
| Lube Pot PSI | 50 | 50.0 | 50 | 50 | 50.0 | 50 | 50 | 50 | 50 |
| Roller Assembly OP ° F. | 197 | 196 | 195 | 195 | 195 | 195 | 196 | 195 | 195 |
| Roller Assembly Center ° F. | 180 | 178 | 178 | 176 | 176 | 177 | 177 | 177 | 177 |
| Roller Assembly Drive ° F. | 195 | 194 | 194 | 194 | 195 | 195 | 195 | 194 | 195 |
| Roll Set PSI | 30 | 30 | 30 | 30 | 30 | 30 | 30 | 30 | 30 |

A number of variations and modifications of the disclosure can be used. It would be possible to provide for some features of the disclosure without providing others.

In accordance with some embodiments, the step of providing the stock sheet can be providing an automotive sheet stock.

In accordance with some embodiments, the step of providing the stock sheet can be providing a can body, end or tab sheet stock. Moreover, the can sheet stock is one of an AA 5182 series-based alloy, an AA5182ES, AA5182SP, AA5182FE, AA5182M8, an AA 3004 series-based alloy, AA3004, AA8011, AA3104, AA35182, AA3104, AA5052, and AA5006. Furthermore, the can sheet stock is one of steel and stainless steel.

An AA 5182 series-based alloy (e.g., AA 5182ES and SP) is useful for producing end stock. The AA 5182 series-based alloy generally has the following composition:
(i) from about 0.20 to about 0.50%, even more commonly from about 0.225 to about 0.45%, and even more commonly from about 0.250 to about 0.35% by weight manganese;

(ii) from about 4.0 to about 4.95%, even more commonly from about 4.5 to about 5%, and even more commonly from about 4.7 to about 4.95% by weight magnesium;

(iii) from about 0.001 to about 0.15%, even more commonly from about 0.005 to about 0.11%, and even more commonly from about 0.01 to about 0.08% by weight copper;

(iv) from about 0.01 to about 0.35%, even more commonly from about 0.015 to about 0.30%, and even more commonly from about 0.020 to about 0.25% by weight iron; and (v) from about 0.01 to about 0.20%, even more commonly from about 0.015 to about 0.175%, and even more commonly from about 0.05 to about 0.15% by weight silicon;

(vi) from about 0.01 to about 0.25%, even more commonly from about 0.025 to about 0.15%, and even more commonly from about 0.05 to about 0.1% by weight chromium;

(vii) from about 0.01 to about 0.25%, even more commonly from about 0.051 to about 0.20%, and even more commonly from about 0.075 to about 0.175% by weight zinc;

(vii) from about 0.001 to about 0.01% and even more commonly from about 0.001 to about 0.075% by weight nickel; and (viii) from about 0.001 to about 0.1%, even more commonly from about 0.005 to about 0.075%, and even more commonly from about 0.01 to about 0.07% by weight titanium.

An AA 5182 series-based alloy (e.g., AA 5182SP and FE) can be useful for producing tab stock. The AA 5182 series-based alloy typically has the following composition:

(i) from about 0.20 to about 0.50%, even more commonly from about 0.225 to about 0.45%, and even more commonly from about 0.250 to about 0.35% by weight manganese;

(ii) from about 4.0 to about 5%, even more commonly from about 4.2 to about 4.8%, and even more commonly from about 4.3 to about 4.6% by weight magnesium or in an alternative formulation even more commonly from about 4.8 to about 4.95% by weight magnesium;

(iii) from about 0.001 to about 0.1%, even more commonly from about 0.005 to about 0.09%, and even more commonly from about 0.01 to about 0.08% by weight copper;

(iv) from about 0.01 to about 0.35%, even more commonly from about 0.015 to about 0.30%, and even more commonly from about 0.020 to about 0.29% by weight iron; and (v) from about 0.01 to about 0.20%, even more commonly from about 0.015 to about 0.175%, and even more commonly from about 0.05 to about 0.15% by weight silicon;

(vi) from about 0.01 to about 0.25%, even more commonly from about 0.025 to about 0.15%, and even more commonly from about 0.05 to about 0.1% by weight chromium;

(vii) from about 0.01 to about 0.25%, even more commonly from about 0.051 to about 0.20%, and even more commonly from about 0.075 to about 0.175% by weight zinc;

(vii) from about 0.001 to about 0.01% and even more commonly from about 0.001 to about 0.075% by weight nickel; and (viii) from about 0.001 to about 0.1%, even more commonly from about 0.005 to about 0.075%, and even more commonly from about 0.01 to about 0.07% by weight titanium.

An AA 5182M8 series-based alloy useful for producing tab stock. The AA 5182M8 series-based alloy generally has the following composition:

(i) from about 0.20 to about 0.50%, even more commonly from about 0.25 to about 0.45%, and even more commonly from about 0.275 to about 0.425% by weight manganese;

(ii) from about 4 to about 5%, even more commonly from about 4.1 to about 4.7%, and even more commonly from about 4.15 to about 4.5% by weight magnesium;

(iii) from about 0.001 to about 0.1%, even more commonly from about 0.01 to about 0.09%, and even more commonly from about 0.015 to about 0.08% by weight copper;

(iv) from about 0.01 to about 0.35%, even more commonly from about 0.050 to about 0.30%, and even more commonly from about 0.075 to about 0.25% by weight iron; and (v) from about 0.001 to about 0.20%, even more commonly from about 0.01 to about 0.175%, and even more commonly from about 0.05 to about 0.15% by weight silicon;

(vi) from about 0.001 to about 0.1%, even more commonly from about 0.01 to about 0.075%, and even more commonly from about 0.025 to about 0.050% by weight chromium;

(vii) from about 0.001 to about 0.01% by weight nickel;

(viii) from about 0.001 to about 0.1%, even more commonly from about 0.01 to about 0.09%, and even more commonly from about 0.015 to about 0.08% by weight titanium; and (ix) from about 0.01 to about 0.25%, even more commonly from about 0.015 to about 0.20%, and even more commonly from about 0.025 to about 0.15% by weight zinc.

An AA 3004 series-based aluminum alloy (e.g., AA 5182ES and SP) is useful for producing body stock. The AA 3304 series-based aluminum alloy can have the following composition:

(i) from about 0.75 to about 2.00%, even more commonly from about 0.85 to about 1.85%, and even more commonly from about 1 to about 1.5% by weight manganese;

(ii) from about 0.5 to about 1.5%, even more commonly from about 0.65 to about 1.4%, and even more commonly from about 0.8 to about 1.3% by weight magnesium;

(iii) from about 0.001 to about 0.35%, even more commonly from about 0.005 to about 0.30%, and even more commonly from about 0.01 to about 0.25% by weight copper;

(iv) from about 0.001 to about 0.9%, even more commonly from about 0.005 to about 0.8%, and even more commonly from about 0.001 to about 0.7% by weight iron; and (v) from about 0.01 to about 0.40%, even more commonly from about 0.015 to about 0.35%, and even more commonly from about 0.05 to about 0.3% by weight silicon;

(vi) from about 0.01 to about 0.25%, even more commonly from about 0.025 to about 0.15%, and even more commonly from about 0.05 to about 0.1% by weight chromium;

(vii) from about 0.01 to about 0.25%, even more commonly from about 0.051 to about 0.20%, and even more commonly from about 0.075 to about 0.175% by weight zinc;

(vii) from about 0.001 to about 0.01% and even more commonly from about 0.001 to about 0.075% by weight nickel; and (viii) from about 0.001 to about 0.1%, even more commonly from about 0.005 to about 0.075%, and even more commonly from about 0.01 to about 0.07% by weight titanium.

It can be appreciated that any of above-identified alloy alloys can contain other elements. Typically, the elements other than those indicated in the above-identified aluminum alloys (AA 5182, AA51892M8, and AA3004 series-based) constitute no more than about 0.15% by weight of the composition.

In some embodiments, the metal sheet is aluminum sheet having AA 5182 specifications and that is used for end or tab stock manufacture. AA 3004 commonly includes 0.9 to 1.1 wt. % magnesium and 0.9 to 1 wt. % manganese, while AA 5182 commonly includes from 4.6 to 4.9 wt. % magnesium and from 0.20 to 0.50 wt. % and more commonly no more than 0.35 wt. % manganese.

The present disclosure, in various aspects, embodiments, and configurations, includes components, methods, processes, systems and/or apparatus substantially as depicted and described herein, including various aspects, embodiments, configurations, subcombination, and subsets thereof. Those of skill in the art will understand how to make and use the various aspects, aspects, embodiments, and configurations, after understanding the present disclosure. The present disclosure, in various aspects, embodiments, and configurations, includes providing devices and processes in the absence of items not depicted and/or described herein or in various aspects, embodiments, and configurations hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more, aspects, embodiments, and configurations for the purpose of streamlining the disclosure. The features of the aspects, embodiments, and configurations of the disclosure may be combined in alternate aspects, embodiments, and configurations other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed aspects, embodiments, and configurations. Thus, the following claims are hereby incorporated into this Detailed Description, with each claim standing on its own as a separate preferred embodiment of the disclosure.

Moreover, though the description of the disclosure has included description of one or more aspects, embodiments, or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A device for applying a lubricant having a melting point of between about 80° F. and about 212° F. to a stock sheet, comprising:
   a heated lubricant-containing vessel comprising a stirring element and one or more first heating elements, wherein the one or more first heating elements provide sufficient thermal energy to maintain the lubricant in a liquid form;
   one or more pairs of applicators to apply the lubricant in a liquid form to first and/or second opposing surfaces of the stock sheet, wherein each of the one or more pairs of applicators comprises:
      a porous applicator element having first and second porous element surfaces;
      a perforated applicator element having first and second perforated element surfaces, wherein the first perforated element surface is in contact with the second porous element surface;
      a liquid-dispensing element, wherein the liquid-dispensing element dispenses the lubricant in a liquid form onto the first and/or second opposing surfaces of the stock sheet, wherein the dispensed lubricant in a liquid form contacts the second perforated element surface; and
      a pressure-adjusting element to increase and/or decrease a pressure applied by outer surfaces of the one or more pairs of applicators on the stock sheet when positioned between the one or more pairs of applicators;
   one or more second heating elements;
   a heated and/or insulated enclosure comprising a void volume, an inlet for receiving the stock sheet, and an outlet for expelling a lubricated stock sheet, wherein the one or more pairs of applicators and the one or more second heating elements are contained within the void volume of the heated and/or insulated enclosure, wherein the one or more second heating elements provide sufficient thermal energy to maintain a temperature within the void volume between about 80° F. and 212° F.; and
   a heated process piping to transport the lubricant in a liquid form from the heated lubricant-containing vessel to the liquid-dispensing elements of each of the one or more pairs of applicators, wherein the heated lubricant-containing vessel is in fluid communication, via the heated process piping, with each of the liquid-dispensing elements of the one or more pairs of applicators.

2. The device of claim 1, wherein each applicator of the one or more pair of applicators has an applicator axis, wherein the liquid-dispensing element is positioned along the applicator axis, wherein the first porous element surface comprises an outer surface of each applicator of the one or more pairs of applicators, and wherein the second perforated element surface comprises an inner surface of each applicator of the one the one or more pairs of applicators.

3. The device of claim 1, wherein:
   the one or more pairs of applicators comprises from two to three pairs of applicators that, are configured consecutively; and
   the device further comprises a coiling element for coiling the lubricated stock sheet.

4. The device of claim 1, wherein the stock sheet is contacted with the one or more pairs of applicators while the stock sheet is moving at a rate of about 100 to about 2,000 feet/minute, wherein each of the first and/or second opposing surfaces of the stock sheet comprises from about 60 mg/foot²/side to about 90 mg/foot²/side of the lubricant in a liquid form, wherein the stock sheet comprises one of steel, stainless steel, copper, tin, nickel, gold, platinum, rhodium, aluminum, an organic polymeric material, a metal, an alloyed metal, and a combination thereof.

5. The device of claim 1, further comprising a compressed air source to apply air pressure to a headspace of the heated lubricant-containing vessel to cause the lubricant in a liquid form to flow pneumatically to the one or more pairs of applicators.

6. The device of claim 1, wherein the perforated applicator element comprises a metallic material, a polymeric material, or a combination thereof, wherein the porous applicator element comprises a textile material, an organic polymeric material, an inorganic polymeric material, or a combination thereof, wherein the perforated applicator element comprises a plurality of apertures, channels, or a combination thereof substantially uniformly distributed on the perforated applicator element and wherein the porous applicator element is one or more of porous and permeable.

7. The device of claim 1, wherein each of the first and/or second opposing surfaces of the lubricated stock sheet has from about 90 to about 100 mg/foot²/side with a variation in thickness of about ±10 mg/foot²/side of the lubricant in a liquid form, wherein the one or more pairs of applicators comprising each pair of applicators have first and second applicator axes aligned in parallel,
and wherein the device further comprises a processor that controls, in response to input from a pressure indicator and by the pressure-adjusting element, the pressure applied to the first and/or second opposing surfaces of the stock sheet by the porous applicator element to deposit the lubricant in a liquid form on the stock sheet, wherein the pressure-adjusting element comprises one of an electromechanical device, a solenoid, a pneumatic device, or a combination thereof.

8. The device of claim 1, wherein the one or more second heating elements comprises plural thermal heating elements that are positioned symmetrically about the one or more pairs of applicators, and wherein the device further comprises:
one or more temperature sensing elements that determine the temperature within the void volume;
a temperature controller in communication with the one or more temperature sensing elements that maintains the temperature within the void volume in a range of from about 80° F. to 212° F.; and
a heat exchanger fan subassembly comprising one or more fans and one or more heat exchanger elements to heat the heated and/or insulated enclosure using hot air produced by the one or more heat exchanger elements.

9. A system for applying a lubricant having a melting point of between about 80° F. and about 212° F. to a stock sheet, comprising:
one or more pairs of applicators to apply the lubricant in a liquid form to first and second opposing surfaces ° Mall the stock sheet;
one or more heating elements;
a heated and/or insulated enclosure comprising a sheet inlet for receiving the stock sheet and a sheet outlet for expelling a lubricated stock sheet, wherein the one or more pairs of applicators and the one or more heating elements are contained with the heated and/or insulated enclosure;
a heated lubricant-containing vessel;
a heated process piping to transport the lubricant in a liquid form from the heated lubricant-containing vessel to liquid-dispensing elements of each of the one or more pairs of applicators, wherein the heated lubricant-containing vessel is in fluid communication, via the heated process piping, with each of the liquid-dispensing elements of the one or more pairs of applicators; and
a coiling element for coiling the lubricated stock sheet.

10. The system of claim 9, wherein each applicator of the one or more pairs of applicators comprises:
a porous applicator element having first and second porous element surfaces;
a perforated applicator element having first and second perforated element surfaces, wherein the first perforated element surface is in contact with the second porous element surface;
a liquid-dispensing element, wherein the liquid-dispensing element dispenses a liquid lubricant, wherein the dispensed lubricant in a liquid form contacts the second perforated element surface; and
a pressure-adjusting element to adjust a pressure applied by the applicator to first and second opposing surfaces of the stock sheet.

11. The system of claim 9, further comprising:
a heat exchanger fan subassembly that heats the heated and/or insulated enclosure to a temperature from about 80° F. to about 212° F. using hot air produced by one or more fans and one or more heat exchanger elements.

12. The system of claim 9, further comprising:
a plurality of temperature sensing elements that sense a temperature; and
a temperature controller in communication with the plurality of temperature sensing elements that controls an amount of heat supplied by the one or more heating elements.

13. The system of claim 9, wherein the heated lubricant-containing vessel comprises a stirring element, wherein a first temperature element monitors a temperature in the heated lubricant-containing vessel and a temperature controller, in response to input from the first temperature element, heats a solid lubricant in the heated lubricant-containing vessel, and wherein a second temperature element monitors a temperature in the heated process piping transporting the lubricant in a liquid form derived from the solid lubricant from the heated lubricant-containing vessel to the one or more pairs of applicators and the temperature controller, in response to input from the second temperature element, heats the lubricant in the heated process piping.

14. A system for applying a lubricant having a melting point of between about 80° F. and about 212° F. to a stock sheet, comprising:
one or more pairs of applicators to dispense the lubricant in a liquid form onto first and/or second opposing surfaces of the stock sheet;
one or more first temperature sensing elements to sense a temperature in proximity to the one or more pairs of applicators;
one or more first heating elements positioned in proximity to the one or more pairs of applicators;
a heated and/or insulated enclosure comprising a void volume, wherein the one or more pairs of applicators, the one or more first temperature sensing elements, and the one or more first heating elements are contained within the void volume;
a heated lubricant-containing vessel comprising one or more second heating elements and one or more second temperature sensing elements to sense a temperature of the heated lubricant-containing vessel, wherein the heated lubricant-containing vessel is in fluid communication with each of the one or more pairs of applicators; and one or more control subassemblies each comprising a temperature controller, wherein:

a first temperature controller is in communication with the one or more first temperature sensing elements and the one or more first heating elements to cause the one or more first heating elements to maintain a temperature of the void volume of the heated and/or insulated enclosure of between about 80° F. and about 212° F.; and a second temperature controller that is in communication with the one or more second temperature sensing elements and the one or more second heating elements to cause the one or more second heating elements to maintain a temperature of the heated lubricant-containing vessel of between about 80° F. and about 212° F.

15. The system of claim 14, wherein the one or more first heating elements comprises a heat exchanger fan subassembly comprising one or more fans and one or more heat exchanger elements.

16. The system of claim 14, wherein each of the one or more pairs of applicators comprises:

a porous applicator element having first and second porous element surfaces;

a perforated applicator element having first and second perforated element surfaces, wherein the first perforated element surface is in contact with the second porous element surface; and a liquid-dispensing element to dispense the lubricant in liquid form onto the first and/or second opposing surfaces of the stock sheet.

17. The system of claim 14, further comprising:

a pressure-adjusting element to increase and/or decrease a pressure applied by outer surfaces of the one or more pairs of applicators on the first and/or second opposing surfaces of the stock sheet when positioned between each pair of the one or more pairs of applicators;

a pressure indicator sensing the pressure applied to the first and/or second opposing surfaces of the stock sheet by the one or more pairs of applicators to deposit the lubricant in liquid form on the stock sheet; and a pressure controller controlling, in response to input from the pressure indicator, the pressure applied to the first and/or second opposing surfaces of the stock sheet, wherein the pressure-adjusting element comprises one of an electromechanical device, a solenoid, a pneumatic device, and a combination thereof.

18. The system of claim 14, further comprising:

a compressed air source to apply air pressure to a headspace of the heated lubricant-containing vessel to cause the lubricant in liquid form to flow pneumatically to the one or more pairs of applicators; and a heated process piping to transport the lubricant in liquid form from the heated lubricant-containing vessel to the one or more pairs of applicators.

19. The system of claim 14, further comprising: a coiling element for coiling a lubricated stock sheet, wherein the lubricant is in a solid form on the first and/or second opposing surfaces of the lubricated stock sheet.

* * * * *